United States Patent
Jeong et al.

(10) Patent No.: US 10,863,436 B2
(45) Date of Patent: Dec. 8, 2020

(54) APPARATUS AND METHOD FOR TRANSCEIVING DATA BY USER TERMINAL

(71) Applicant: Samsung Electronics Co., Ltd., Gyeonggi-do (KR)

(72) Inventors: Sang-Soo Jeong, Gyeonggi-do (KR); Song-Yean Cho, Seoul (KR); Soeng-Hu Kim, Gyeonggi-do (KR); Han-Na Lim, Seoul (KR); Beom-Sik Bae, Gyeonggi-do (KR); Young-Kyo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 14/432,166

(22) PCT Filed: Sep. 27, 2013

(86) PCT No.: PCT/KR2013/008698
§ 371 (c)(1),
(2) Date: Mar. 27, 2015

(87) PCT Pub. No.: WO2014/051387
PCT Pub. Date: Apr. 3, 2014

(65) Prior Publication Data
US 2015/0282083 A1   Oct. 1, 2015

(30) Foreign Application Priority Data

Sep. 27, 2012  (KR) .................. 10-2012-0108294
Oct. 26, 2012  (KR) .................. 10-2012-0120041

(51) Int. Cl.
*H04W 52/02*   (2009.01)
*H04W 76/28*   (2018.01)
*H04W 4/70*    (2018.01)

(52) U.S. Cl.
CPC ... *H04W 52/0225* (2013.01); *H04W 52/0216* (2013.01); *H04W 52/0222* (2013.01);
(Continued)

(58) Field of Classification Search
CPC .... G06F 1/3203; G06F 1/3206; G06F 1/3237; G06F 1/3287; G06F 1/3296;
(Continued)

(56) References Cited

U.S. PATENT DOCUMENTS 7,073,079 B1 * 7/2006 Karsi ................ G06F 1/3203
                                                            713/320
8,385,248 B2   2/2013 Sung et al.
(Continued)

FOREIGN PATENT DOCUMENTS

CN    1527487 A    9/2004
CN    1784836 A    6/2006
(Continued)

OTHER PUBLICATIONS

International Search Report dated Feb. 19, 2014 in connection with International Patent Application No. PCT/KR2013/008698, 9 pages.
(Continued)

Primary Examiner — Khoa Huynh

(57) ABSTRACT

The present invention is a method for transmitting a data packet by a user terminal in a mobile communication system. The method enters a power saving mode for transmitting the data packet only if a channel state satisfies a transmission threshold value, compares the index indicating the channel state and the transmission threshold value upon occurrence of a data packet to be transmitted, starts transmission of the data packet if the index indicating the channel state is greater than the transmission threshold value, and proceeds with the transmission of the data packet until the
(Continued)

time set by the timer that starts at the same time as the transmission of the data packet expires.

13 Claims, 18 Drawing Sheets

(52) U.S. Cl.
CPC ... *H04W 52/0232* (2013.01); *H04W 52/0245* (2013.01); *H04W 76/28* (2018.02); *H04W 4/70* (2018.02); *Y02D 30/70* (2020.08)

(58) Field of Classification Search
CPC .............. H04W 4/005; H04W 28/044; H04W 52/0209; H04W 52/0216; H04W 52/0222; H04W 52/0225; H04W 52/0232; H04W 52/0245; H04W 76/048; Y02B 60/50; Y02D 30/70
See application file for complete search history.

(56) References Cited

U.S. PATENT DOCUMENTS

| | | | |
|---|---|---|---|
| 8,467,781 | B2 | 6/2013 | Lee et al. |
| 2004/0174938 | A1 | 9/2004 | Kim |
| 2004/0253955 | A1 | 12/2004 | Love et al. |
| 2006/0209703 | A1 | 9/2006 | Baker et al. |
| 2007/0183355 | A1 | 8/2007 | Kuchibhotla et al. |
| 2008/0167089 | A1 | 7/2008 | Suzuki et al. |
| 2011/0019557 | A1 | 1/2011 | Hassan et al. |
| 2012/0184272 | A1 | 7/2012 | Zhao et al. |
| 2013/0148600 | A1* | 6/2013 | Moulsley ............... H04B 7/024 370/329 |
| 2013/0229963 | A1* | 9/2013 | Asterjadhi .......... H04W 74/085 370/311 |
| 2013/0294307 | A1* | 11/2013 | Johansson ......... H04W 52/0209 370/311 |

FOREIGN PATENT DOCUMENTS

| | | |
|---|---|---|
| CN | 1795687 A | 6/2006 |
| CN | 101385255 A | 3/2009 |
| CN | 101617552 A | 12/2009 |
| EP | 1414201 A1 | 4/2004 |
| KR | 10-2009-0071875 | 7/2009 |
| KR | 10-2011-0065632 | 6/2011 |
| KR | 10-2011-0088446 | 8/2011 |
| WO | WO 2004/100394 A1 | 11/2004 |
| WO | WO 2008/097965 A2 | 8/2008 |
| WO | WO 2011/087233 A2 | 7/2011 |

OTHER PUBLICATIONS

Written Opinion of International Searching Authority dated Feb. 19, 2014 in connection with International Patent Application No. PCT/KR2013/008698, 7 pages.
Extended European Search Report dated Oct. 24, 2016 in connection with European Application No. 13842439.5, 10 pages.
Communication pursuant to Rule 164(1) EPC dated May 13, 2016 in connection with European Appl. No. 13842439.5; 6 pages.
Office Action dated Nov. 10, 2017 in connection with Chinese Patent Application No. 201380058879.9.
State Intellectual Property Office of the People's Republic of China Second Office Action regarding Application No. 201380058879.9, dated Jul. 4, 2018, 25 pages.

* cited by examiner

APPARATUS AND METHOD FOR TRANSCEIVING DATA BY USER TERMINAL

CROSS-REFERENCE TO RELATED APPLICATION(S)

The present application claims priority under 35 U.S.C. § 365 to International Patent Application No. PCT/KR2013/008698 filed Sep. 27, 2013, entitled "APPARATUS AND METHOD FOR TRANSCEIVING DATA BY USER TERMINAL". International Patent Application No. PCT/KR2013/008698 claims priority under 35 U.S.C. § 365 and/or 35 U.S.C. § 119(a) to Korean Patent Application No. 10-2012-0108294 filed Sep. 27, 2012 and Korean Patent Application No. 10-2012-0120041 filed Oct. 26, 2012, and which are incorporated herein by reference into the present disclosure as if fully set forth herein.

TECHNICAL FIELD

The present disclosure relates to an apparatus and method for transceiving data by a User Equipment (UE), and more particularly, to an apparatus and method for transmitting and receiving data to improve user-experienced service quality while reducing battery consumption of the UE.

BACKGROUND ART

The emergence of smart phones makes it possible to provide various types of services to users. For example, the smart phones provide users with not only a voice communication service, but a data communication service and a service based on a variety of applications.

Typically, one of major problems of a portable terminal is increasing the available time of a battery supplying an operating power. Increasing the available time of a battery has become a crucial problem to be solved especially, in smart phones providing various services. That is, for smart phones, there is an urgent need for a scheme for efficiently using a limited capacity of the battery to increase the available time of the battery.

In particular, for a Machine Type Communication (MTC) device providing an MTC service such as sensing, tracking, or the like, in which a battery is difficult to charge or replace once mounted, a need exists for a scheme for efficiently using the battery to increase the available time of the battery.

Generally, for terminals having communication functions, such as smart phones, MTC terminals, and so forth, the most part of the power is consumed by a communication module. That is, the terminal consumes the most part of its power to transmit and receive data. Such a tendency is intensified when the terminal is located in a cell boundary.

FIG. 1 illustrates active power and interference according to a location of a terminal in a typical mobile communication system;

Referring to FIG. 1, a communication system is assumed to include a serving cell 100 and a neighboring cell 150. The serving cell 100 may include a serving base station 110, and the neighboring cell 150 may include a neighboring base station 160.

A first terminal 130 located in the serving cell 100 is located closer to the serving base station 110 than the neighboring base station 160. Thus, active power increases and interference with the neighboring base station 160 decreases. As a result, the first terminal 130 has higher active power and lower interference than those of a second terminal 140.

On the other hand, the second terminal 140, which is included in the serving cell 100 and located in a cell boundary, is located closer to the neighboring base station 160 than to the serving base station 110. Thus, an active power decreases and interference with the neighboring base station 160 increases. As a result, the second terminal 140 has a lower active power and a higher interference level than the first terminal 130.

Since the second terminal 140 has a low active power, a transmission power has to be increased to allow the serving base station 110 to receive the data in transmission of the data to the serving base station 110. As a result, power consumption of the second terminal 140 increases.

As such, when two terminals transceiving the same amount of data are in different locations in a typical mobile communication system, a terminal transceiving data in a cell boundary consumes a more power than the other terminal located in an area other than the cell boundary.

DISCLOSURE

Technical Problem

The present disclosure provides an apparatus and method for transceiving data to reduce battery consumption of a User Equipment (UE).

The present disclosure also provides an apparatus and method for transceiving data to improve user-experienced service quality, while reducing battery consumption of a UE.

Technical Solution

In accordance with an aspect of the present disclosure, there is provided a method for transmitting a data packet by a User Equipment (UE) in a mobile communication system, the method including entering a low power mode in which data packet transmission is possible, if a channel state satisfies a transmission threshold, comparing an index indicating the channel state with the transmission threshold if a data packet to be transmitted is generated, and starting transmission of the data packet if the index indicating the channel state is larger than the transmission threshold, and continuing transmission of the data packet, until an on-duration timer starting from a point of the transmission of the data packet expires.

In accordance with another aspect of the present disclosure, there is provided a method for transmitting a data packet by a Mobile Management Entity (MME) in a mobile communication system, the method including determining whether a User Equipment (UE) operates in a low power mode in which data packet reception is possible, if a channel state satisfies a transmission threshold, upon generation of a data packet to be transmitted and sending, to the UE, a paging message including information indicating whether an immediate response to reception of the paging message is required, by considering a service priority for the data packet, if the UE operates in the low power mode.

In accordance with another aspect of the present disclosure, there is provided a method for transmitting a data packet by a base station in a mobile communication system, the method including determining whether a User Equipment operates in a low power mode in which data packet reception is possible, if a channel state satisfies a transmission threshold, upon generation of a data packet to be transmitted, comparing an index indicating the channel state with the transmission threshold value if the UE operates in the low power mode, and starting transmission of the data packet if the index indicating the channel state is larger than the transmission threshold, and continuing transmission of the data packet until an on-duration timer starting at a point of the transmission of the data packet expires.

In accordance with another aspect of the present disclosure, there is provided a transceiving method of a User Equipment (UE) in a mobile communication system, the transceiving method including transmitting information indicating whether an extended Discontinuous Reception (DRX) cycle longer than a normal DRX cycle is supported to a Mobile Management Entity (MME) and receiving, from the MME, information regarding a DRX cycle to be applied to an idle mode, which is determined based on whether the UE supports an extended DRX cycle and whether the base station supports an extended DRX cycle.

In accordance with another aspect of the present disclosure, there is provided a transceiving method of a Mobile Management Entity (MME) in a mobile communication system, the transceiving method including receiving, from a User Equipment (UE), information indicating whether an extended Discontinuous Reception (DRX) cycle longer than a normal DRX cycle is supported, receiving, from a base station, information indicating whether the extended DRX cycle is supported, and determining a DRX cycle to be applied to an idle mode of the UE based on whether the UE supports an extended DRX cycle and the base station supports an extended DRX cycle, and transmitting information regarding the determined DRX cycle to the UE.

Advantageous Effects

The present disclosure proposes a power saving mode in which a User Equipment (UE) transmits data only in a good channel state. As the UE operates in the power saving mode, battery consumption of the UE is reduced in data transmission and reception, thereby expanding the available time of a battery with efficient use of the limited capacity of the battery.

MODE FOR CARRYING OUT THE INVENTION

Hereinafter, various embodiments of the present disclosure will be described in relation to the accompanying drawings. In the following description, a detailed description of known functions and configurations incorporated herein will be omitted when it may obscure the subject matter of the present disclosure. Terms used herein are defined based on functions in the present disclosure and may vary according to users, operators' intention or usual practices. Therefore, the definition of the terms should be made based on contents throughout the specification.

In an embodiment of the present disclosure to be described below, a description will be made of an apparatus and method for transceiving data to reduce battery consumption of a User Equipment (UE) in, for example, a Long Term Evolution (LTE) mobile communication system. However, the apparatus and method for transceiving data proposed in the present disclosure is applicable to any other mobile communication systems as well as the LTE mobile communication system.

Figure 1:
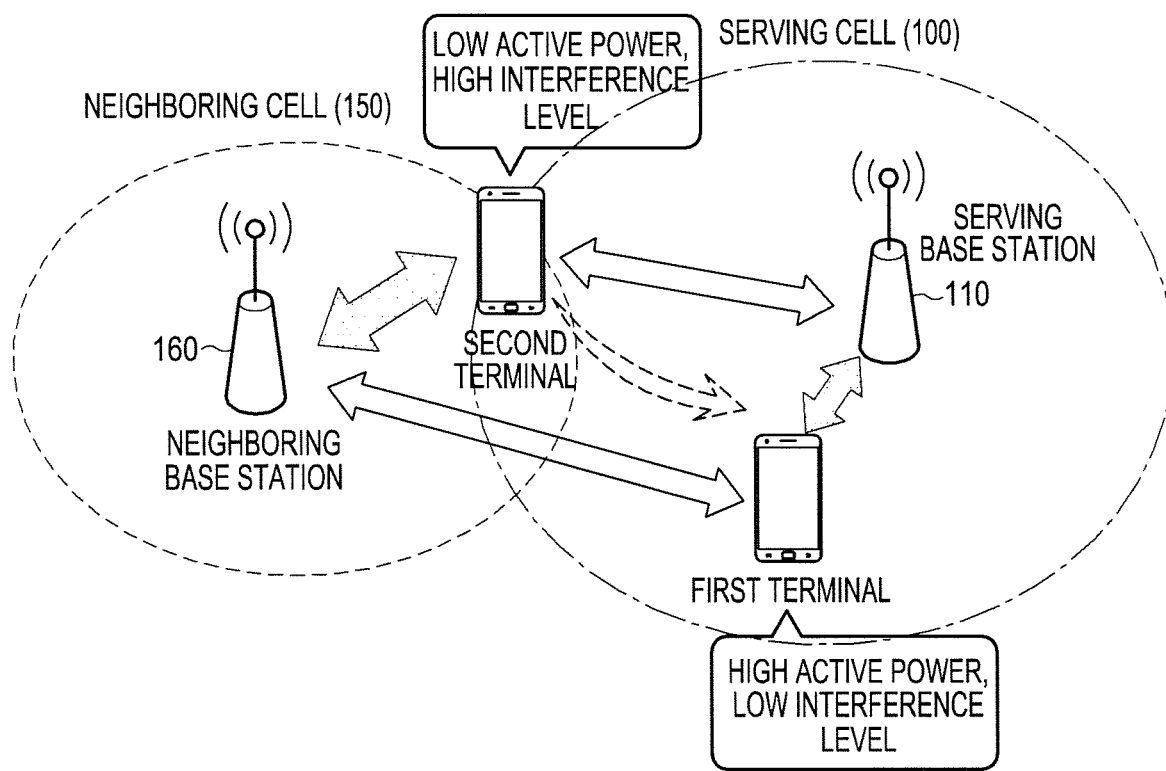
FIG. 1 illustrates an active power and interference according to a location of a terminal in a typical mobile communication system.
Figure 2:
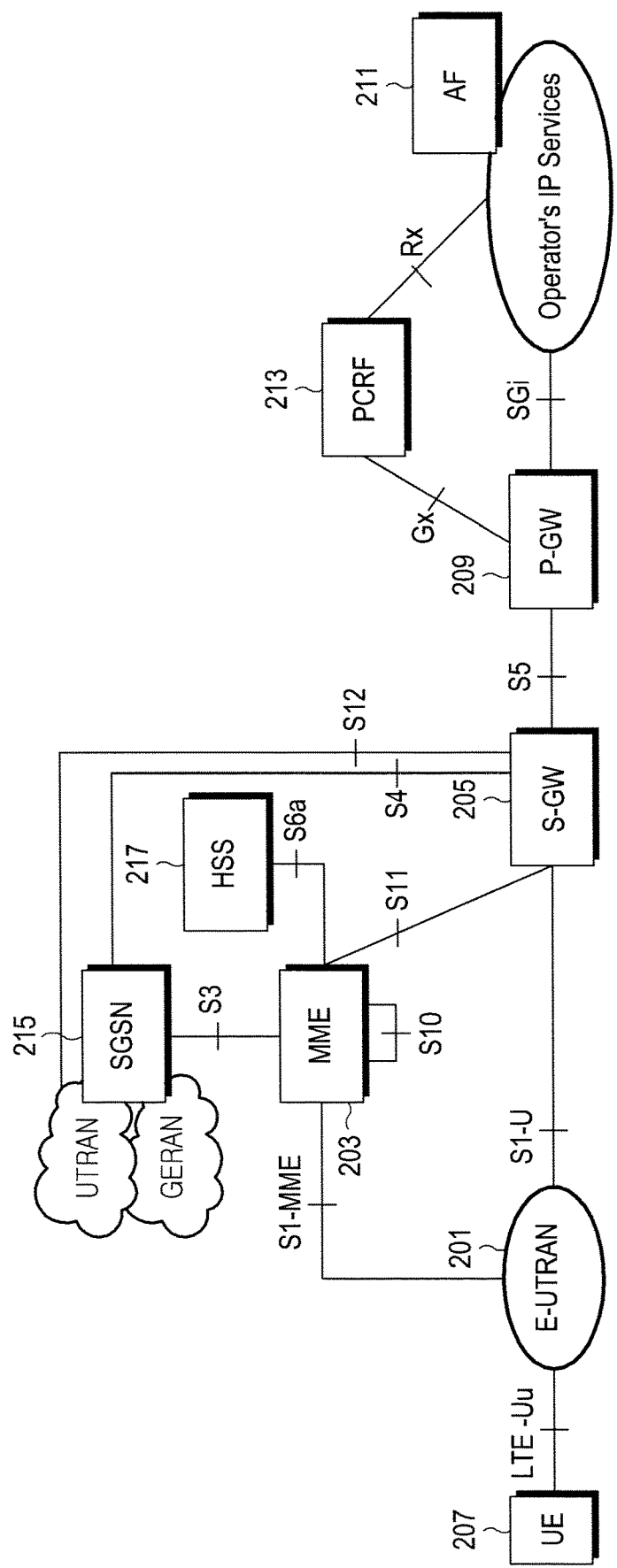
FIG. 2 illustrates a structure of an LTE mobile communication system for applying an embodiment of the present disclosure.

FIG. 2 illustrates a structure of an LTE mobile communication system for applying an embodiment of the present disclosure.

Referring to FIG. 2, a Radio Access Network (RAN) of an LTE mobile communication system may include an Evolved Universal Terrestrial Radio Access Network (E-UTRAN) 201 including an evolved Node B (eNB), a Mobile Management Entity (MME) 203, and a Serving Gateway (S-GW) 205. The E-UTRAN 201 is connected with the MME 203 and the S-GW 205 through an interface S1. Depending on an entity to which the S1 interface is connected, the S1 interface may be classified into an S1-MME interface connected to the MME 203 and an S1-U interface connected to the S-GW 205.

A User Equipment (UE) 207 connects to an external network through the E-UTRAN 201, the S-GW 205, and a Packet Data Network (PDN) Gateway (P-GW) 209. The UE 207 is connected with the E-UTRAN 201 through an LTE-Uu interface.

An Application Function (AF) 211 exchanges information about an application with a user. A Policy and Charging Rules Function (PCRF) 213 collectively controls a Quality of Service (QoS) and charging with respect to user traffic, and delivers, for application, Policy and Charging Control 9PCC) rules corresponding to a policy to the P-GW 209.

The eNB, which is an RAN node, corresponds to a Radio Network Controller (RNC) of a Universal Terrestrial Radio Access Network (UTRAN) and a Base Station Controller (BSC) of a Global System for Mobile Communications (GSM) EDGE RAN (GERAN) system. The eNB is connected with the UE 207 through a radio channel and functions similarly with an existing RNC and an existing base station controller. The eNB may occupy several cells at the same time.

In the LTE mobile communication system, every user traffic including a real-time service such as Voice over Internet Protocol (IP) (VoIP) is provided through a shared channel. Thus, a device for collecting state information of the UE 207 for scheduling is required, and this operation is managed by the eNB.

The S-GW 205 provides a data bearer, and generates or removes a data bearer under control of the MME 203. The MME 203 is in charge of various control functions, and one MME 203 may be connected with multiple eNBs included in the E-UTRAN 201.

A Serving General Packet Radio Service (GPRS) Support Node (SGSN) 215 provides routing for data transmission in Universal Mobile Telecommunications Systems (UMTS). A Home Subscriber Server (HSS) 217 stores and manages a current location of the UE 207, an address of a serving node, and user's security related information.

A unit capable of applying a QoS in an LTE mobile communication system is an Evolved Packet System (EPS) bearer. One EPS bearer is used to transmit IP flows having the same QoS requirements. In the EPS bearer, a QoS-related parameter may be designated. A QoS Class Identifier (QCI) and an Allocation and Retention Priority (ARP) may be included in the EPS bearer.

The EPS bearer corresponds to a Packet Data Protocol (PDP) context of a GPRS system. One EPS bearer belongs to PDN connection which may have an Access Point Name (APN) as an attribute.

An embodiment of the present disclosure to be described below proposes a method in which, in a good channel state, by considering, for example, a Modulation and Coding Scheme (MCS) level, a UE transmits data only when the MCS level is higher than a preset threshold, thereby reducing battery consumption of the UE.

Also, in an embodiment of the present disclosure, a mode in which the UE considers a channel state to transmit data only in a good channel state is defined as a low power mode. Also, an embodiment of the present disclosure proposes a method in which even when operating in the low power mode, the UE performs data transmission for high-priority user data even in a bad channel state.

Figure 3:
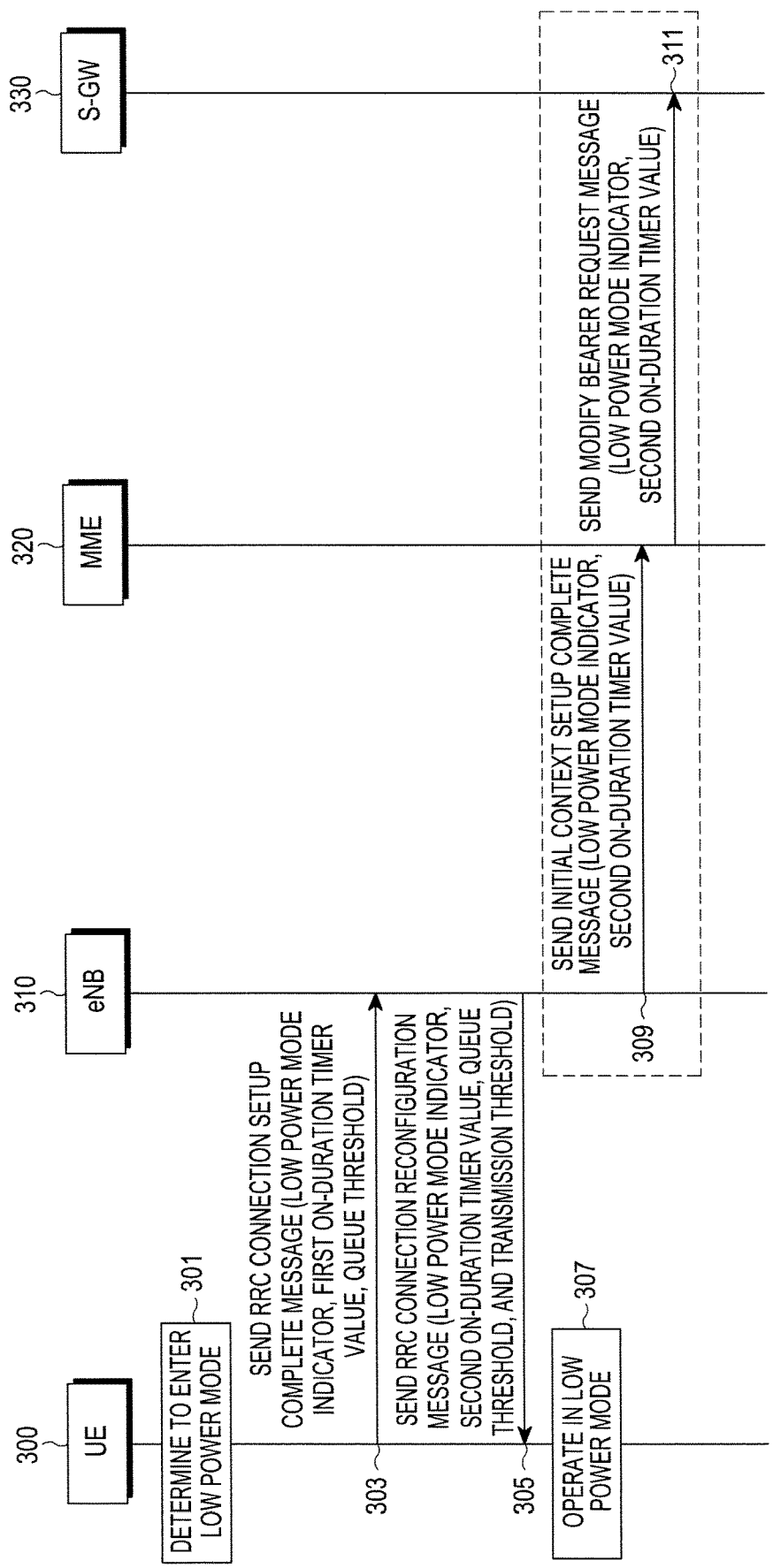
FIG. 3 is a diagram illustrating a procedure in which a UE enters a low power mode in an AS layer of a mobile communication system according to an embodiment of the present disclosure.
Figure 4:
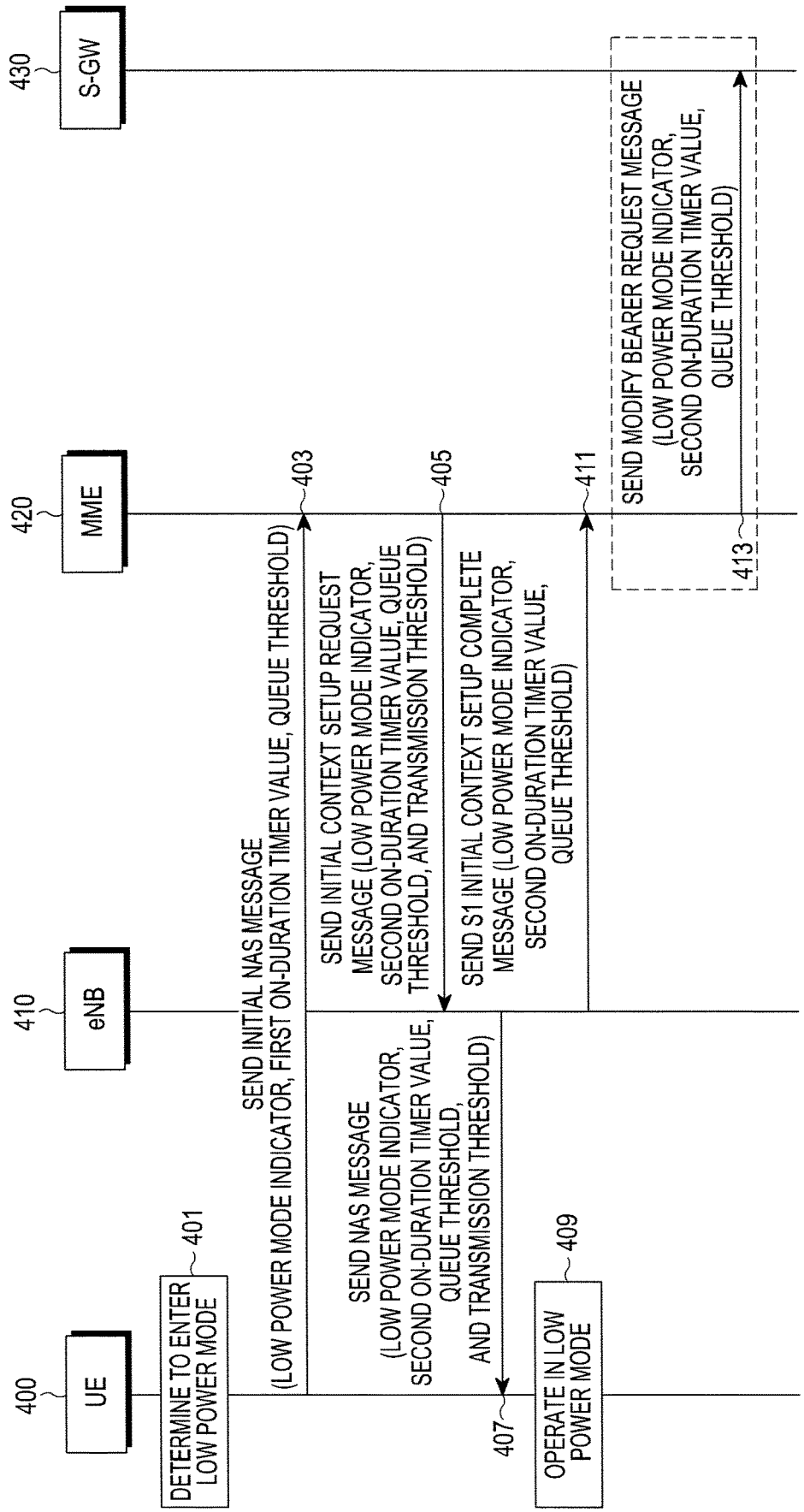
FIG. 4 is a diagram illustrating a procedure in which a UE enters a low power mode in an NAS layer of a mobile communication system according to an embodiment of the present disclosure.

In FIGS. 3 and 4 to be described below, a description will be made of a case where a procedure for the UE according to an embodiment of the present disclosure entering the low power mode is performed in an Access Stratum (AS) layer and a case where the procedure is performed in a Non Access Stratum (NAS) layer. For example, the UE may determine to enter the low power mode in at least one of the following cases.

1. a case where a user using a terminal directly sets the low power mode through a user interface;
2. a case where provisions regarding a UE's operation in the low power mode are written when the user subscribes;
3. a case where the UE is set to operate in the low power mode when shipped or is set to Open Mobile Alliance (OMA)-Device Management (DM) by a common carrier;
4. a case where the remaining battery capacity of the UE is lower than a predetermined level;
5. a case where a screen of the UE is currently turned off; and
6. a case where there is no user input for a predetermined time.

FIG. 3 illustrates a procedure in which a UE enters in a low power mode in an AS layer of a mobile communication system according to an embodiment of the present disclosure.

Referring to FIG. 3, the mobile communication system may include a UE 300, an eNB 310, an MME 320, and an S-GW 330.

Upon entering the low power mode in operation 301, the UE 300 transmits a low power mode indicator, a first on-duration timer value, and a queue threshold to the eNB 310 through a Radio Resource Control (RRC) connection setup complete message in operation 303.

Herein, the low power mode indicator is an indicator indicating that the UE 300 is to operate in the low power mode. The first on-duration timer value is a set value of a timer that counts a cycle in which the UE 300 transmits data when operating in the low power mode, that is, a cycle from a data transmission start point to a data transmission end point. The queue threshold is a value set in a queue in which non-transmitted data packets are stored to prevent a transmission data loss. That is, the queue threshold is a value set to prevent transmission data from being lost if a time continues for a long time during which a channel state fails to satisfy a data transmission threshold. For example, if the number of data packets stored in the queue satisfies the queue threshold, the UE 300 may transmit a data packet immediately or transmit a request for resource allocation, ignoring the transmission threshold.

The eNB 310 recognizes from the low power mode indicator included in the received RRC connection setup complete message that the UE 300 determines to enter the low power mode. In this case, if the eNB 310 permits the low power mode, the eNB 310 stores the low power mode indicator, the first on-duration timer value, and the queue threshold. Herein, it is described as an example that the UE 300 sends the low power mode indicator to request the eNB 310 to permit entrance to the low power mode.

However, if the UE 300 does not transmit the low power mode indicator, the eNB 310 may receive a low power mode indicator through an S1 initial context setup request message transmitted from the MME 320. In this case, the eNB 310 may store the low power mode indicator, the first on-duration timer value, and the queue threshold if permitting the low power mode.

Thereafter, the eNB 310 transmits a low power mode indicator, a second on-duration timer value, a queue threshold, and a transmission threshold to the UE 300 through an RRC connection reconfiguration message in operation 305.

Herein, the second on-duration timer value is determined by the eNB 310 based on the first on-duration timer value received in operation 203, and the second on-duration timer value is a set value of a timer that counts a cycle in which data is transmitted when the UE 200 operates in the low power mode. The transmission threshold is a value to be compared with an index indicating a channel state for data transmission when the UE 200 operates in the low power mode.

The UE 200 having received the RRC connection reconfiguration message enters and operates in the low power mode in operation 307. That is, the UE 200 compares the index indicating the channel state, for example, an MCS level, with the transmission threshold, and starts driving a second on-duration timer when the MCS level is higher than the transmission threshold. The UE 200 transmits a corresponding packet until the second on-duration timer expires.

The eNB 310 transmits the low power mode indicator and the second on-duration timer value through an S1 initial context setup complete message in operation 309. The MME 320 transmits the received low power mode indicator and second on-duration timer value to the S-GW 330 through a modify bearer request message in operation 311. That is, the eNB 310 notifies the MME 320 and the S-GW 330 of the UE 300 operating in the low power mode in operations 309 and 311.

FIG. 4 illustrates a procedure in which a UE enters the low power mode in an NAS layer of a mobile communication system according to an embodiment of the present disclosure.

Referring to FIG. 4, the mobile communication system may include a UE 400, an eNB 410, an MME 420, and an S-GW 430.

Once determining to enter the low power mode in operation 401, the UE 400 transmits the low power mode indicator, the first on-duration timer value, and the queue threshold to the MME 420 through an initial NAS message in operation 403. Herein, the initial NAS message may be one of an attach request message, a Tracking Area Update (TAU) request message, and a service request message.

If necessary, the MME 420 checks subscription information to determine whether the UE 400 is set to operate in the low power mode. If the MME 420 permits an operation in the low power mode, the MME 420 stores the low power mode indicator, the first on-duration timer value, and the queue threshold.

The MME 420 transmits the low power mode indicator, the second on-duration timer value, the queue threshold, and the transmission threshold to the eNB 410 through the S1 initial context setup request message. The eNB 410 transmits the low power mode indicator, the second on-duration timer value, the queue threshold value, and the transmission threshold to the UE 400 through the NAS message. Herein, the second on-duration timer value is a value determined by the MME 420 based on the first on-duration timer value received in operation 402. The NAS message is one of an attach accept message and a TAU accept message.

The UE 400 having received the NAS message enters the low power mode to operate in the low power mode in operation 409. That is, the UE 200 compares the index indicating the channel state, for example, the MCS level, with the transmission threshold to start driving of the second on-duration timer when the MCS level is higher than the transmission threshold. The UE 200 then transmits a corresponding data packet until the second on-duration timer expires.

The eNB 410 transmits the low power mode indicator, the second on-duration timer value, and the queue threshold to the MME 420 through the S1 initial context setup complete message in operation 411. The MME 420 transmits the received low power mode indicator, second on-duration timer value, and queue threshold to the MME 420 through the S1 initial context setup complete message in operation 411. The MME 420 transmits the low power mode indicator, the second on-duration timer value, and the queue threshold to the S-GW 430 through the modify bearer request message in operation 413. That is, the eNB 410 notifies the MME 420 and the S-GW 430 of the UE 400 operating in the low power mode in operations 411 and 413.

Once recognizing that the UE 400 operates in the low power mode, the S-GW 430 sets a Downlink Data Notification (DDN) timer value to be longer. The DDN timer value is a count value of a time until the MME 420 responds when the MME 420 is notified that downlink data to be transmitted to the UE 400 in the idle state is generated. The UE 400 in an RRC connected state may be set to transmit downlink data to the eNB 410 while the second on-duration timer is being driven.

Figure 5:
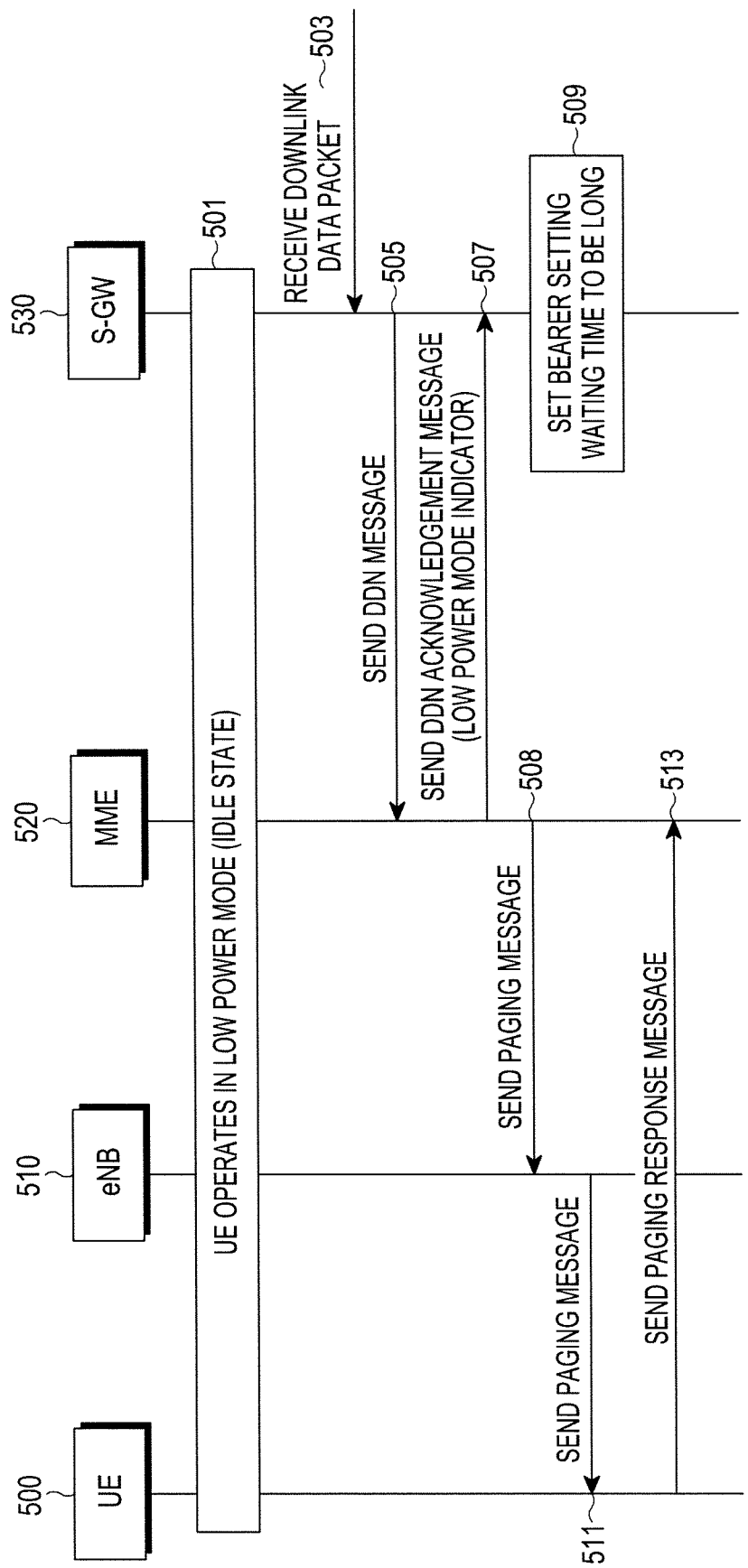
FIG. 5 is a diagram illustrating a procedure in which a UE in an idle state, which operates in a low power mode, is paged in a mobile communication system according to an embodiment of the present disclosure.

FIG. 5 is a diagram illustrating a procedure for paging an idle-state UE operating in a low power mode in a mobile communication system according to an embodiment of the present disclosure.

Referring to FIG. 5, the mobile communication system may include a UE 500, an eNB 510, an MME 520, and an S-GW 530.

Upon receiving a downlink data packet destined to the idle-state UE 500 operating in the low power mode in operation 501, in operation 503, then the S-GW 530 sends a DDN message indicating that the downlink data packet to be transmitted to the UE 500 to the MME 520 in operation 505.

The MME 520 determines a service priority of a data packet based on information included in the DDN message, for example, an EPS bearer Identifier (ID) or an ARP. In case of an urgent service requiring an immediate response of the UE 500, the MME 520 transmits information indicating that the immediate response is required through a paging message in operation 508. However, in case of a service requiring no immediate response, the MME 520 transmits information indicating that the immediate response is not required through a paging message in operation 508. An example of the information indicating that the immediate response is required may be immediate response flag information. An example of the information indicating that the immediate response is not required may be delayed response flag information. The MME 520 transmits Home Public Land Mobile Network (HPLMN) information, registration PLMN information regarding the terminal's current registration, or Tracking Area Identify (TAT) information through a paging message in operation 508. An example of the HPLMN information may be an HPLMN ID or an International Mobile Subscriber Identify (IMSI) of the terminal. An example of the registration PLMN information may be a registration PLMN ID, and an example of the TAI information may be a TAI list.

The MME 520 sends a DDN acknowledgement message including the low power mode indicator to the S-GW 530 in response to the DDN message in operation 507. The S-GW 530 having received the low power mode indicator determines that the UE 500 operates in the low power mode, and sets a waiting time for bearer setting for data packet transmission to be longer, in operation 509.

The eNB 510 sends the paging message received from the MME 520 to the UE 500 in operation 511. If HPLMN information is included in the paging message received from the MME 520, the eNB 510 uses the HPLMN information to determine a priority of paging message transmission.

For example, paging of a user having a particular HPLMN is lowering or raising a transmission priority. If a registration PLMN ID or TAI information is included in the paging message received from the MME 520, the eNB 510 uses the registration PLMN ID or the TAI information to determine a priority of paging message transmission. For example, if a PLMN in which a UE is currently registered is a particular PLMN, a priority of paging message transmission is raised or lowered.

The UE 500 sends a paging response message (a service request message or an extended service request message) to the MME 520 according to flag information included in the received paging message, that is, immediate response flag information or delayed response flag information in operation 513. That is, upon receiving the paging message including the immediate response flag information, the UE 500 sends an immediate paging response message. However, upon receiving a paging message including the delayed response flag information, the UE 500 sends a paging response message if transmission conditions are satisfied.

Figure 6:
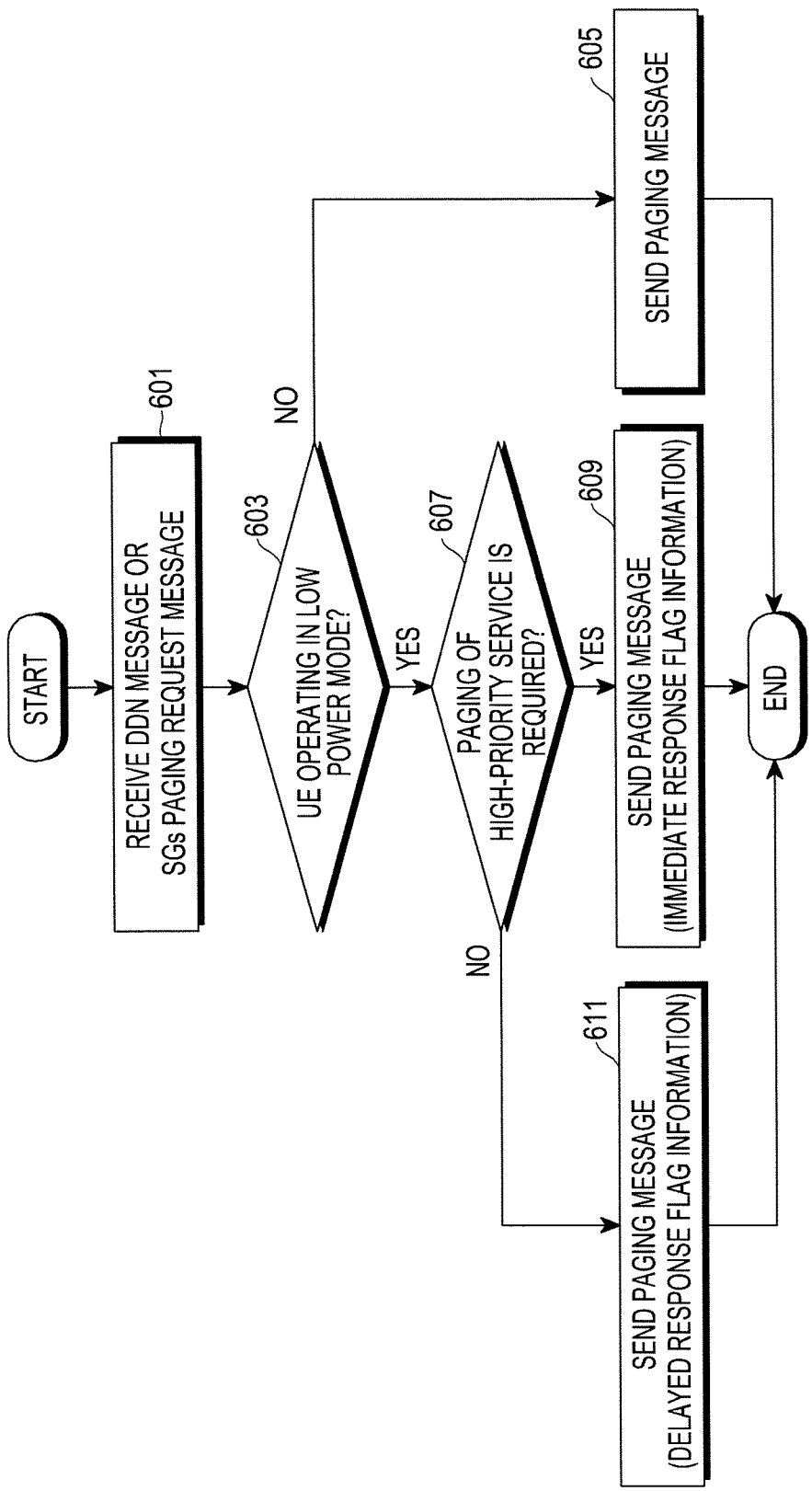
FIG. 6 is a flowchart illustrating a control flow in which an MME sends a paging message to a UE in an idle state in a mobile communication system according to an embodiment of the present disclosure.

FIG. 6 is a flowchart illustrating a control flow in which an MME sends a paging message to an idle-state UE in a mobile communication system according to an embodiment of the present disclosure.

Referring to FIG. 6, an MME receives a DDN message from an S-GW or a SGs paging request message from a Mobile Switching Center (MSC) in operation 601. Upon receiving the DDN message or the SGs paging request message, the MME determines whether a UE operates in a low power mode in operation 603. Herein, the SGs paging request message is a paging request message sent through the SGs interface connected between the MME and the MSC.

The MME sends a general paging message to the UE in operation 605, if determining that the UE does not operate in the low power mode.

If determining that the UE operates in the low power mode, the MME determines whether paging for a high-priority service is required in operation 607. For example, if the SGs paging request message is a paging message for a voice call service or an EPS bearer indicated by an EPS bearer ID included in the DDN message corresponds to a preset special case, then the MME may determine that paging for the high-priority service is required. Herein, the special case means a case where the EPS bearer a bearer having QCI #1 or QCI #5, or an APN of PDN connection to which the EPS bearer belongs is an IP Multimedia Subsystem (IMS) APN. Meanwhile, the bearer having QCI #1 is a bearer providing a Voice over LTE (VoLTE) service, and the bearer having QCI #5 is a bearer having an urgent ARP.

If paging for the high-priority service is required, the MME transmits information indicating that an immediate response is required, that is, immediate response flag information, to the eNB through the paging message in operation 609.

If paging for the high-priority service is not required, the MME transmits information indicating that an immediate response is not required, that is, delayed response flag information, to the eNB through the paging message in operation 611.

Although not shown in FIG. 6, the MME may include a receiver, a controller, and a transmitter. The receiver performs operation 601. The controller performs operations 603 and 607. The transmitter performs operations 605, 609, and 611.

Figure 7:
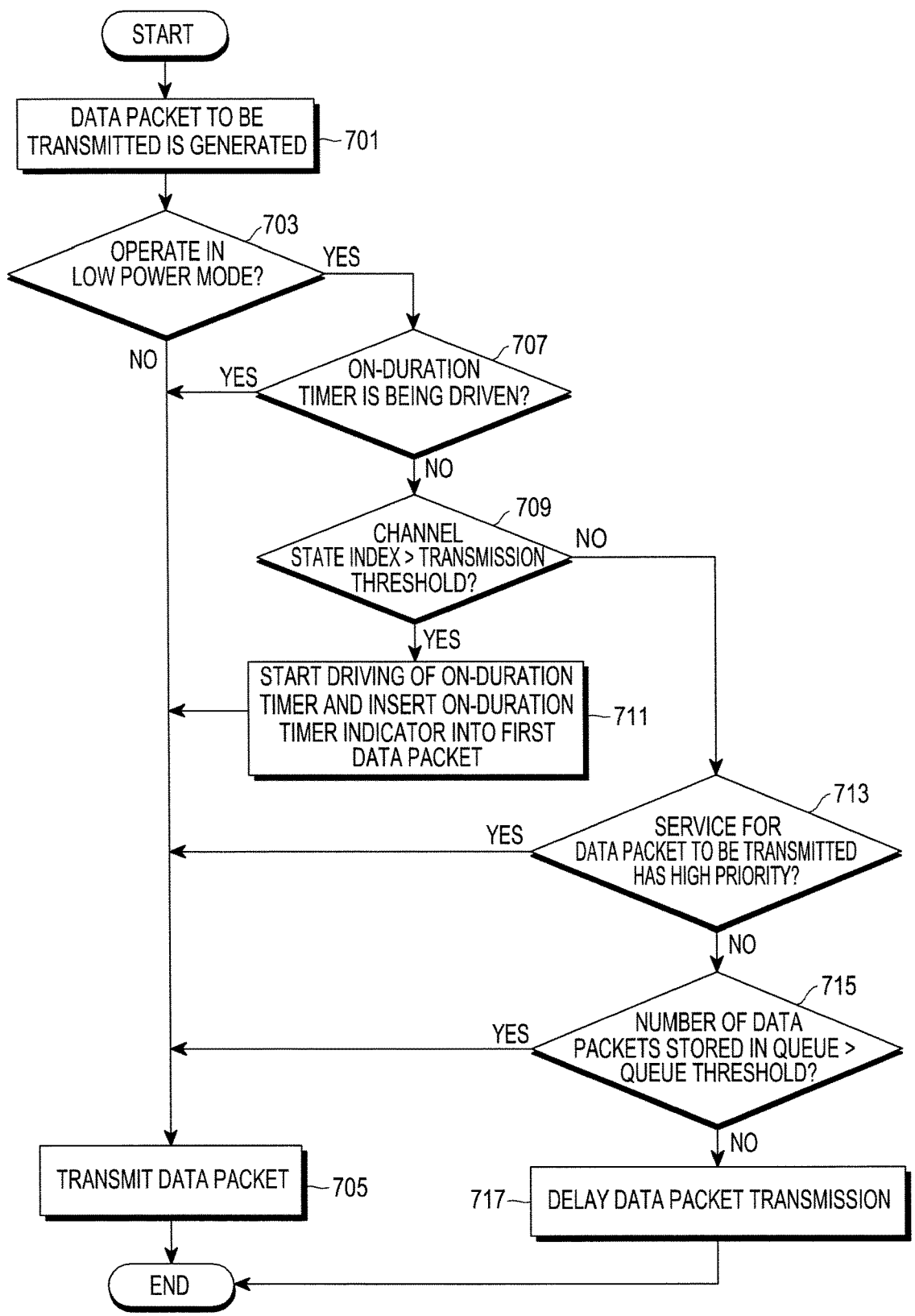
FIG. 7 is a flowchart illustrating a control flow in which a UE in an RRC connected state transmits uplink data in a mobile communication system according to an embodiment of the present disclosure.

FIG. 7 is a flowchart illustrating a control flow in which a UE in an RRC connected state transmits uplink data in a mobile communication system according to an embodiment of the present disclosure.

Referring to FIG. 7, if a data packet to be transmitted is generated in operation 701, the UE identifies its operation mode in operation 703. That is, the UE determines whether the UE currently operates in the low power mode.

If the UE does not currently operate in the low power mode, the UE transmits a data packet in operation 705. The data packet transmission in operation 705 includes a process in which the UE sends a Buffer Status Report (BSR) message or a Scheduling Request (SR) message to the eNB to request uplink resource allocation and transmits a data packet by using the allocated uplink resource.

When currently operating in the low power mode, the UE determines whether an on-duration timer for counting a cycle in which data transmission continues in the low power mode is being driven in operation 707. If determining that the on-duration timer is currently driven, the UE transmits a data packet in operation 705. However, if determining that the on-duration timer is not currently driven, the UE determines whether an index indicating a channel state, for example, an MCS level is higher than a transmission threshold for data transmission in the low power mode.

If determining that the MCS level is higher than the transmission threshold, the UE starts driving of the on-duration timer in operation 711. The UE inserts an on-duration timer indicator into a first data packet and transmits the first data packet in operation 705.

If the MCS level is lower than or the same as the transmission threshold, the UE determines a service priority of a data packet to be transmitted in operation 713. That is, the UE determines whether a service for data to be transmitted has a high priority. If the service for the data to be transmitted has a high priority, the UE transmits the data packet in operation 705. That is, the UE in an RRC connected state transmits a data packet in operation 705, if the data packet is transmitted through a Signaling Radio Bearer (SRB), if an EPS bearer including the data packet is a bearer having QCI #1 or QCI #5, that is, a bearer providing the VoLTE service, or if the EPS bearer including the data packet is a bearer having an urgent ARP.

If the service for the data to be transmitted does not have a high priority, the UE determines whether the number of data packets stored in a queue is larger than the queue threshold in operation 715. If determining that the number of data packets stored in the queue is larger than the queue threshold, the UE transmits the data packet to prevent a data packet loss in operation 705. However, if determining that the number of data packets stored in the queue is smaller than or equal to the queue threshold, the UE delays transmission of the data packet in operation 717.

Herein, it has been described as an example that if the number of data packets stored in the queue exceeds the queue threshold, a data packet stored in the queue is transmitted to prevent a data packet loss. However, in another way to prevent a data packet loss, a data packet stored in the queue may be transmitted when a waiting time of the data packet stored in the queue exceeds a predetermined time.

Figure 8:
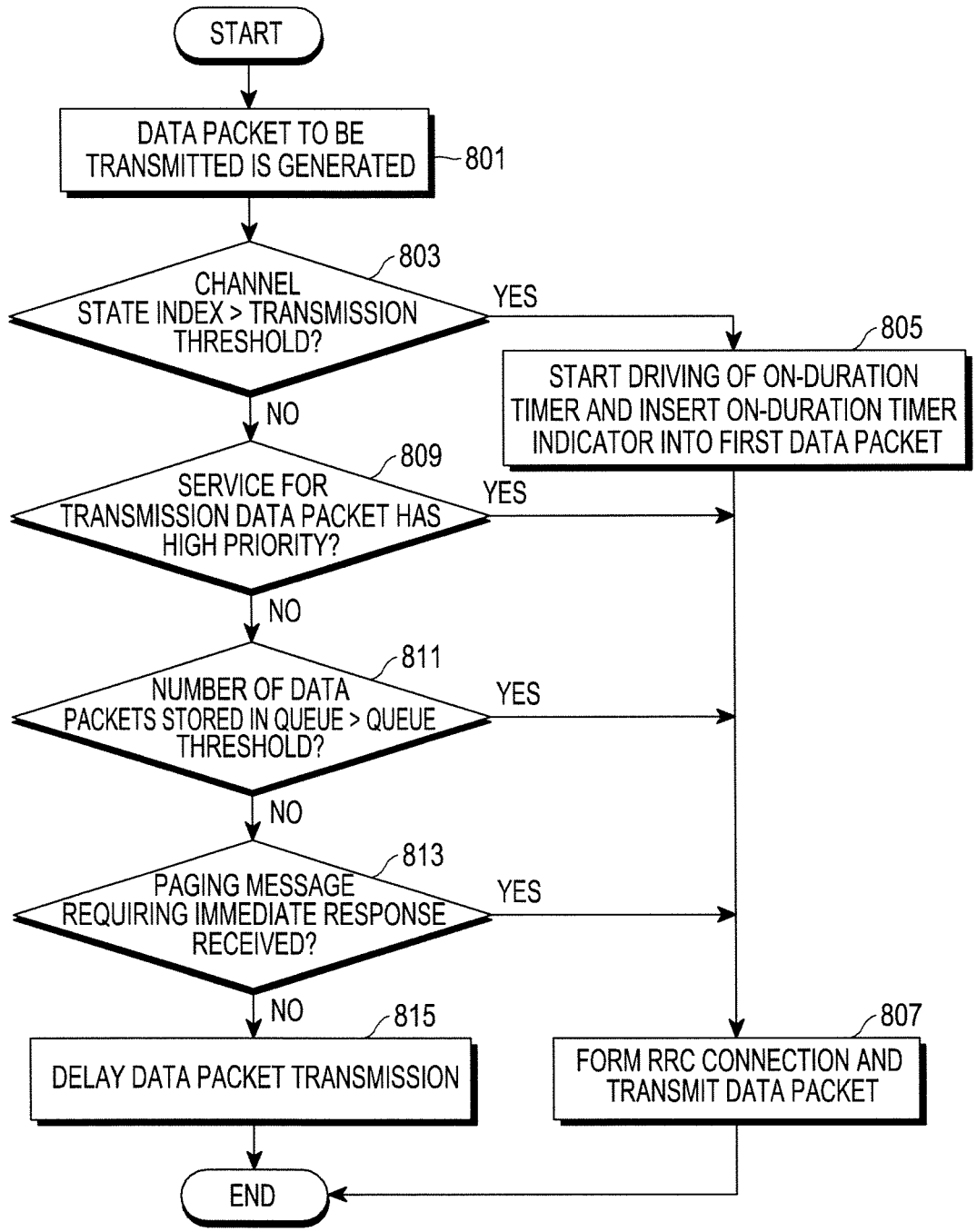
FIG. 8 is a flowchart illustrating a control flow in which a UE in an idle state transmits uplink data in a mobile communication system according to an embodiment of the present disclosure.

FIG. 8 is a flowchart illustrating a control flow in which an idle-state UE transmits uplink data in a mobile communication system according to an embodiment of the present disclosure.

Referring to FIG. 8, if a data packet to be transmitted is generated in operation 801, the UE determines whether an index indicating a channel state, for example, an MCS level is higher than a transmission threshold for data transmission in the low power mode in operation 803.

If determining that the MCS level is higher than the transmission threshold, the UE starts driving of an on-duration timer that counts a cycle in which data transmission continues in the low power mode in operation 805. Thereafter, in operation 807, the UE forms RRC connection and transmits the data packet into which the on-duration timer indicator is inserted through the formed RRC connection. The data packet transmission process includes a process in which the UE sends a buffer state report message or a service request message to the eNB to request allocation of an uplink resource and transmits a data packet or an NAS message by using the allocated uplink resource.

If the MCS level is lower than or the same as the transmission threshold, the UE determines a service priority of a data packet to be transmitted in operation 809. That is, the UE determines whether a service for the transmission data has a high priority. If determining that the service has a high priority, the UE forms RRC connection to transmit a data packet in operation 807. If a cause for RRC connection is signaling (that is, NAS message transmission), an urgent case, Circuit Switched Fall Back (CSFB), or Voice over IMS (VoIMS), then the idle-state UE forms RRC connection to transmit a data packet in operation 807.

However, if the service for the transmission data does not have a high priority, the UE determines whether the number of data packets stored in the queue is greater than the queue threshold in operation 811. If determining that the number of data packets stored in the queue is greater than the queue threshold, the UE forms RRC connection and transmits the data packet to prevent a data packet loss in operation 807.

If determining that the number of data packets stored in the queue is less than or equal to the queue threshold, the UE determines whether a paging message requiring an immediate response is received in operation 813. For example, the paging message requiring the immediate response may be a paging message including immediate response flag information.

Upon receiving the paging message requiring the immediate response, the UE forms RRC connection and transmits a data packet (Service Request message) in operation 807. However, if having not received the paging message requiring the immediate response, the UE delays data packet transmission in operation 815.

Herein, it has been described as an example that if the number of data packets stored in the queue exceeds the queue threshold, the UE transmits a data packet stored in the queue to prevent a data packet loss. However, in another way to prevent a data packet loss, a data packet stored in the queue may be transmitted when a waiting time of the data packet stored in the queue exceeds a predetermined time.

Although not shown in the drawings, the UE may include a receiver, a controller, and a transmitter. The receiver receives a downlink data packet transmitted from the eNB. The controller performs operations 701, 703, 707 to 717, 801 to 805, and 809 to 815. The transmitter performs operations 705 and 807.

Figure 9:
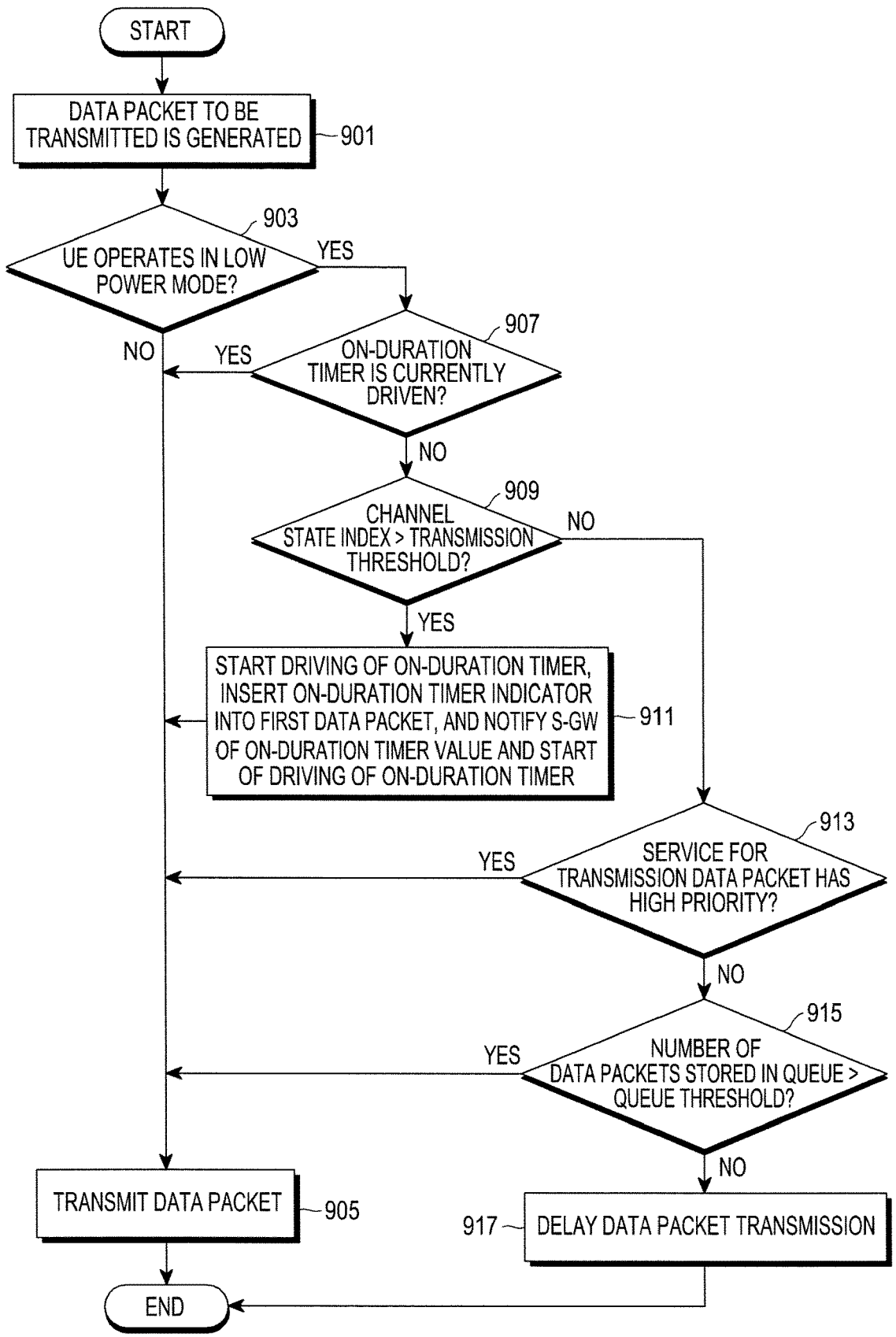
FIG. 9 is a flowchart illustrating a control flow in which an eNB transmits downlink data to a UE in an RRC connected state in a mobile communication system according to an embodiment of the present disclosure.

FIG. 9 is a flowchart illustrating a control flow in which an eNB transmits downlink data to a UE in an RRC connected state in a mobile communication system according to an embodiment of the present disclosure.

Referring to FIG. 9, if a data packet to be transmitted is generated in operation 901, the eNB identifies an operation mode of a corresponding UE, that is, a UE to which the data packet is to be transmitted, in operation 903.

If the UE does not currently operate in the low power mode, the eNB transmits the data packet in operation 905. Transmission of the data packet in operation 905 includes a process in which the eNB sends a resource allocation grant message to the UE to allocate a downlink resource and transmits the data packet to the UE.

If the UE currently operates in the low power mode, the eNB determines whether an on-duration timer for counting a cycle in which data transmission continues in the low power mode is currently driven in operation 907. If the on-duration timer is currently driven, the eNB transmits the data packet in operation 905. However, if the on-duration timer does not currently operate, the eNB determines whether an index indicating a channel state, for example, an MCS level is greater than a transmission threshold for data transmission in the low power mode in operation 909.

If the MCS level is greater than the transmission threshold, the eNB starts driving of the on-duration timer in operation 911. The eNB then inserts an on-duration timer indicator into the first data packet, and transmits an on-duration timer value and information indicating that driving of the on-duration timer has started to the S-GW. Thereafter, the eNB transmits the data packet in operation 905. Herein, the on-duration timer value and the information indicating that driving of the on-duration timer has started are transmitted to the S-GW, so that if the UE operates in the low power mode, the S-GW transmits the data packet to a base station during driving of the on-duration timer, thereby preventing unnecessary packet delivery between base stations in case of lack of a transmission queue of a base station or in case of a handover.

If the MCS level is lower than or the same as the transmission threshold, the eNB determines a service priority for the transmission data packet in operation 913. That is, the eNB determines whether the service for the transmission data packet has a high priority. If the service for the transmission data packet has a high priority, the eNB transmits the data packet in operation 905.

For example, the eNB transmits the data packet in operation 905, if the data packet is transmitted through an SRB, if an EPS bearer including the data packet is a bearer having QCI #1 or QCI #5, that is, a bearer providing the VoLTE service, or if the EPS bearer including the data packet is a bearer having an urgent ARP.

However, if the service for the transmission data packet does not have a high priority, the eNB determines whether the number of data packets stored in the queue is greater than the queue threshold in operation 915. If the number of data packets stored in the queue is greater than the queue threshold, the eNB transmits the data packet to prevent a data packet loss in operation 905. If the number of data packets stored in the queue is less than or equal to the queue threshold, the eNB delays transmission of the data packet in operation 917.

Herein, it has been described as an example that if the number of data packets stored in the queue exceeds the queue threshold, a data packet stored in the queue is transmitted to prevent a data packet loss. However, in another way to prevent a data packet loss, a data packet stored in the queue may be transmitted when a waiting time of the data packet stored in the queue exceeds a predetermined time.

Although not shown in the drawings, the eNB may include a receiver, a controller, and a transmitter. The receiver receives an uplink data packet transmitted from the UE. The controller performs operations 901, 903, and 907 to 917. The transmitter performs operation 905.

Figure 10:
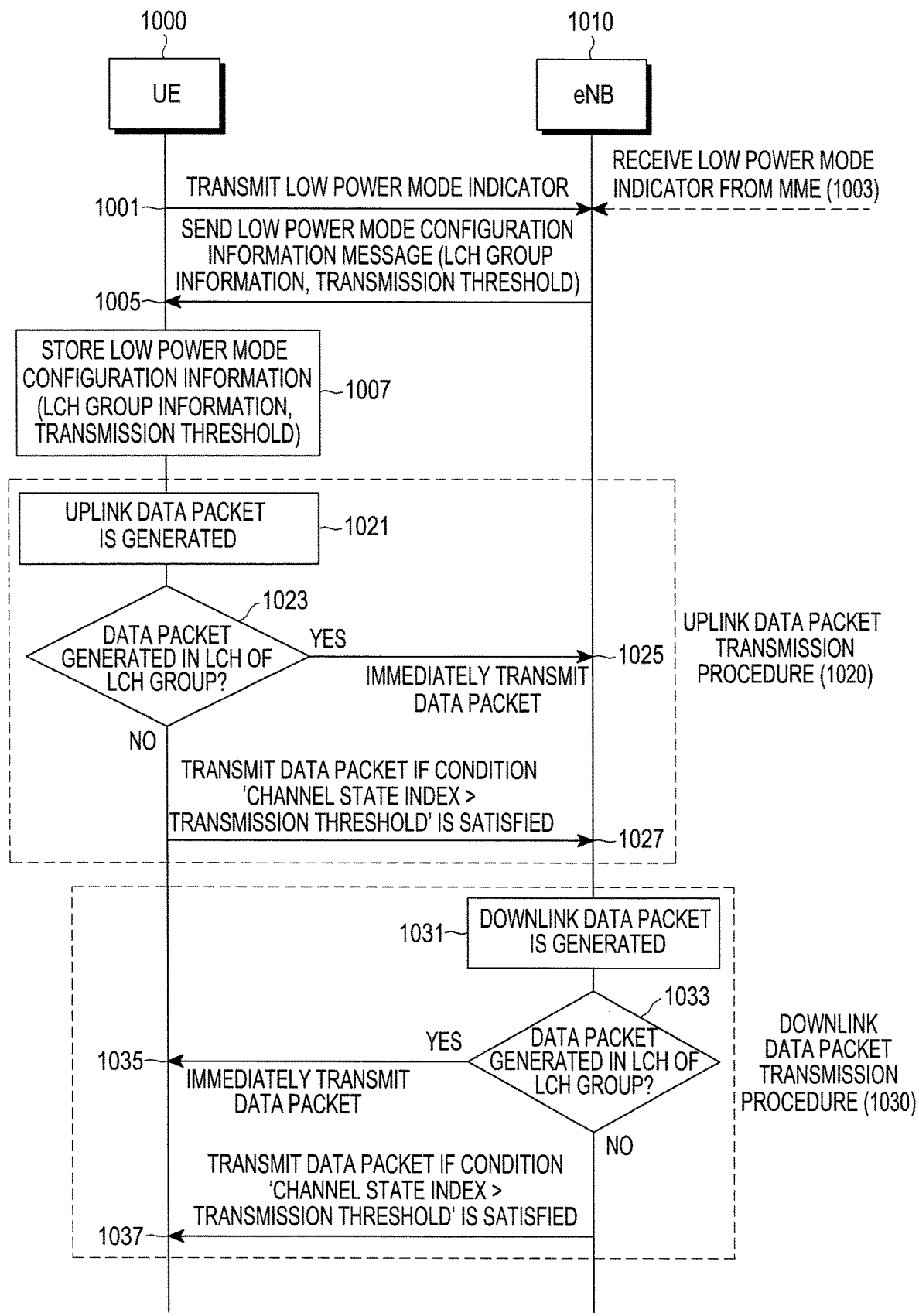
FIG. 10 is a diagram illustrating a procedure in which a UE and an eNB transmit data packets in a mobile communication system according to an embodiment of the present disclosure.

FIG. 10 is a diagram illustrating a procedure in which a UE and an eNB transmit data packets in a mobile communication system according to an embodiment of the present disclosure.

Referring to FIG. 10, the mobile communication system may include a UE 1000 and an eNB 1010.

The UE 1000 sends a low power mode indicator indicating that the UE 1000 operates in the low power mode to the eNB 1010, in operation 1001. In operation 1005, the eNB 1010 sends a low power mode configuration information message including Logical Channel (LCH) group information and a transmission threshold to the UE 1000 if permitting the low power mode. Herein, the LCH group information includes LCHs to which the low power mode is to be applied. The transmission threshold is a threshold compared with an index indicating a channel state for data transmission in the low power mode. The LCH group information and the transmission threshold may be transmitted through an RRC message.

Herein, it has been descried as an example that the eNB 1010 receives the low power mode indicator from the UE 1000. However, the low power mode indicator may be received from an MME as in operation 1003. In this case, the eNB 1010 receives the low power mode indicator from the MME through an S1 initial context setup request message. The eNB 1010 sends a low power mode configuration message including the LCH group information and the transmission threshold to the UE 1000 if permitting the low power mode, in operation 1005.

Thereafter, the UE 1000 stores low power mode configuration information, that is, the LCH group information and the transmission threshold, in operation 1007. If an uplink data packet to be transmitted to the eNB 1010 is generated in operation 1021, the UE 1000 transmits the uplink data packet, taking the low power mode configuration information into account, in operation 1025.

That is, if the uplink data packet is generated in operation 1021, the UE 1000 operating in the low power mode determines whether the uplink data packet is a packet generated in an LCH of an LCH group, taking previously stored LCH group information into account, in operation 1023. If the uplink data packet is generated in an LCH of the LCH group, the UE 1000 immediately transmits the generated data packet to the eNB 1010 in operation 1025.

However, if the uplink data packet is not a packet generated in the LCH of the LCH group, the UE 1000 determines whether a condition that an index indicating a channel state is greater than a previously stored transmission threshold is satisfied. In operation 1027, the UE 1000 transmits the generated data packet if the condition that the index indicating the channel state is greater than the transmission threshold is satisfied.

Herein, an uplink data packet transmission procedure 1020 of the UE 1000 operating in the low power mode has been described using operations 1021 through 1027. Hereinbelow, a downlink data packet transmission procedure 1030 of the eNB 1010 permitting the UE 1000 to operate in the low power mode will be described using operations 1031 to 1037.

If a downlink data packet to be transmitted to the UE 1000 operating in the low power mode is generated in operation 1031, the eNB 1010 determines whether the downlink data packet has been generated in an LCH of an LCH group, taking previously known LCH group information into account, in operation 1033. If the downlink data packet has been generated in the LCH of the LCH group, the eNB 1010 immediately transmits the generated data packet to the UE 1000 in operation 1035.

However, if the downlink data packet has not been generated in the LCH of the LCH group, the eNB 1010 determines whether a condition that an index indicating a channel state is greater than a previously known transmission threshold is satisfied. The eNB 1010 transmits the generated data packet to the UE 1000 if the index indicating the channel state is greater than the transmission threshold in operation 1037.

Figure 11:
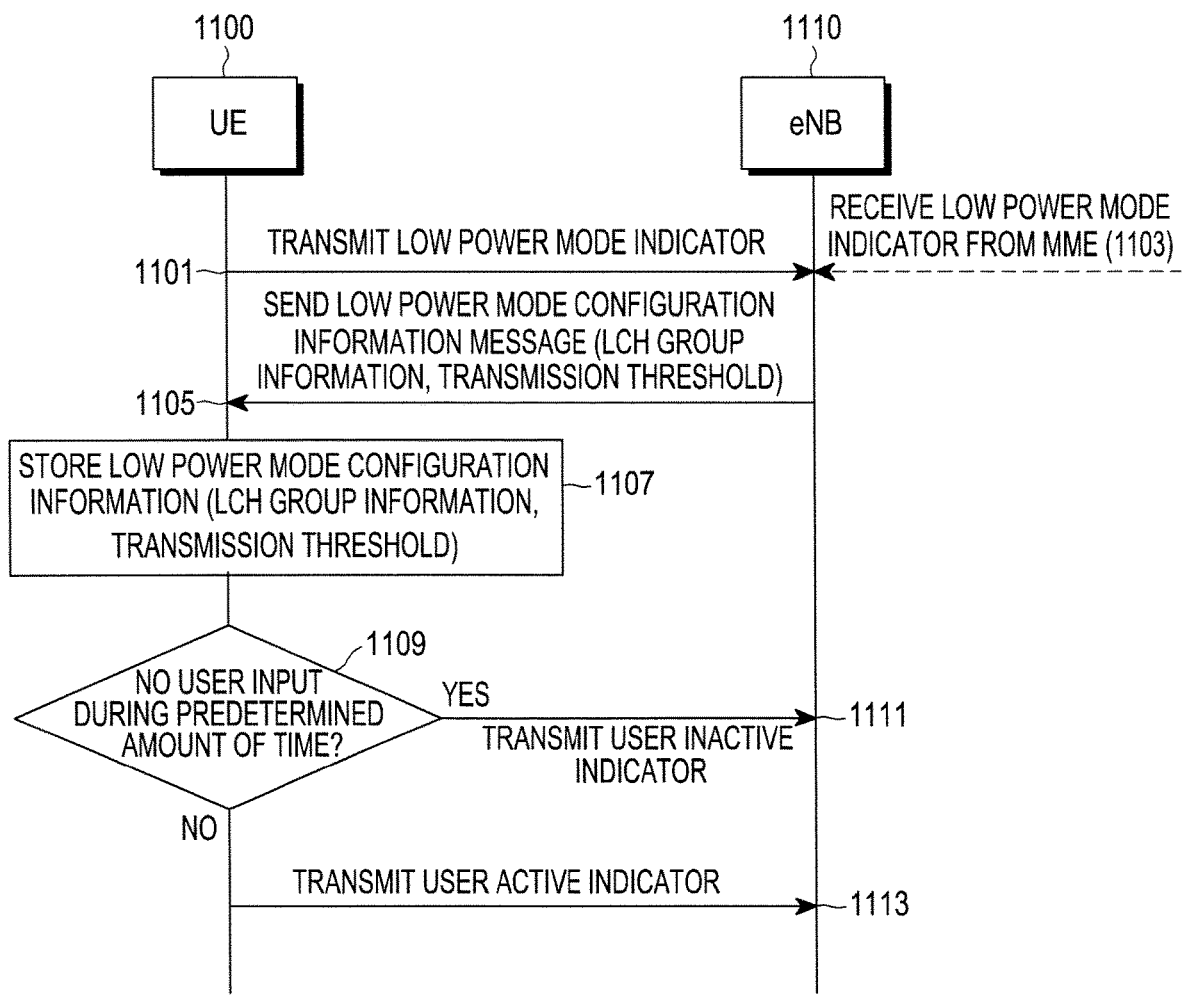
FIG. 11 is a diagram illustrating a procedure in which a UE reports a user state to an eNB in a mobile communication system according to an embodiment of the present disclosure.

FIG. 11 is a diagram illustrating a procedure in which a UE reports a user state to an eNB in a mobile communication system according to an embodiment of the present disclosure.

Referring to FIG. 11, the mobile communication system may include a UE 1100 and an eNB 1110.

The UE 1100 transmits a low power mode indicator indicating that the UE 1100 operates in the low power mode to the eNB 1110 in operation 1101. The eNB 1110 sends a low power mode configuration information message including LCH group information and a transmission threshold to the UE 1100, if permitting the low power mode in operation 1105. Herein, the LCH group information includes LCHs to which the low power mode is to be applied, and the transmission threshold is a threshold to be compared with an index indicating a channel state for data transmission in the low power mode. The LCH group information and the transmission threshold may be transmitted through an RRC message.

Herein, it has been descried as an example that the eNB 1100 receives the low power mode indicator from the UE 1110, but the eNB 1100 may receive the low power mode indicator from an MME in operation 1103. In this case, the eNB 1100 receives the low power mode indicator from the MME through an S1 initial context setup request message, and sends the low power mode configuration information message including the LCH group information and the transmission threshold to the UE 1100 if permitting the low power mode, in operation 1105.

The UE 1100 stores low power mode configuration information, that is, the LCH group information and the transmission threshold, in operation 1107.

The UE 1100 determines whether a user input does not exist for a predetermined amount of time in operation 1109. If a screen of the UE 1100 is turned off due to absence of the user input during the predetermined amount of time, the UE 1100 transmits a user inactive indicator including information indicating that a user state is an inactive state to the eNB 1110, in operation 1111.

If the user input exists within the predetermined amount of time, the UE 1100 transmits a user active indicator including information indicating that the user state is an active state to the eNB 1110 in operation 1113.

Herein, the user inactive indicator and the user active indicator may be expressed as user inactive flag information and user active flag information, respectively. In this case, the user inactive flag information and the user active flag information are transmitted to the eNB 1110 through a separate RRC message or a Medium Access Control (MAC) Control Element (CE).

The uplink data packet transmission procedure 1020 and the downlink data packet transmission procedure 1030 described in FIG. 10 are applied when the user state is the inactive state. This is because when the user state is the active state, the state is sensitive to a transmission delay and thus fast data packet transmission is required.

Figure 12:
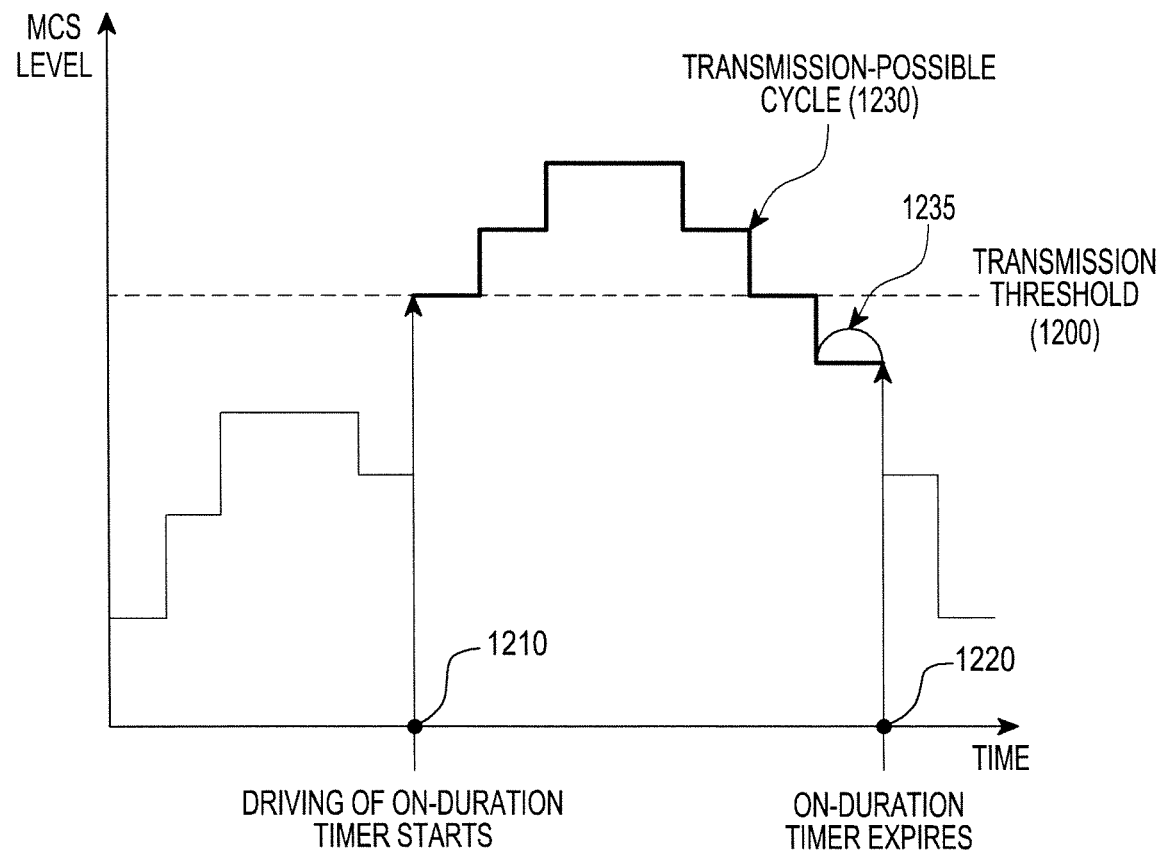
FIG. 12 is a graph showing a cycle in which a UE operating in a low power mode transmits data in a mobile communication system according to an embodiment of the present disclosure.

FIG. 12 is a graph showing a cycle in which a UE operating in a low power mode transmits data in a mobile communication system according to an embodiment of the present disclosure.

Referring to FIG. 12, the UE operating in the low power mode starts data transmission at a corresponding point 1210 if an MCS level is higher than a transmission threshold 1200. In this case, the UE starts, at the point 1210, driving of an on-duration timer that counts a cycle in which data transmission continues, and continues data transmission up to a point 1220 at which the on-duration timer expires. Thus, a transmission-possible cycle in which the UE operating in the low power mode may transmit data is as indicated by 1230. In particular, in a cycle 1235 included in the transmission-possible cycle 1230, the MCS level does not satisfy the transmission threshold condition, but data transmission continues due to the on-duration timer. As such, in the low power mode, a channel state is also considered in data transmission, but once data transmission starts due to the on-duration timer, the data transmission continues for a predetermined amount of time, that is, a time corresponding to an on-duration timer value, thereby minimizing battery consumption of the UE.

Figure 13:
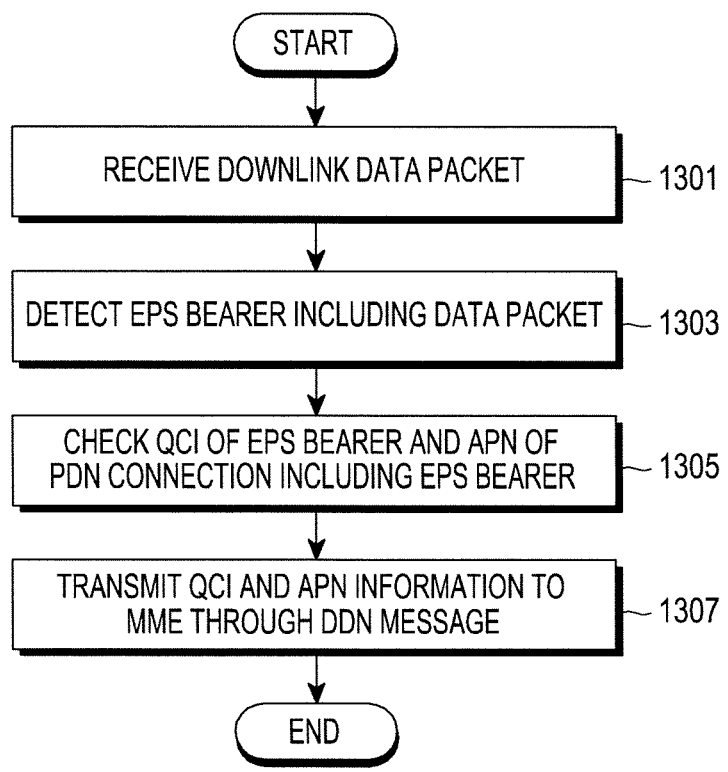
FIG. 13 is a flowchart illustrating a control flow in which an S-GW sends a DDN message in a mobile communication system according to an embodiment of the present disclosure.

FIG. 13 is a flowchart illustrating a control flow in which an S-GW sends a DDN message in a mobile communication system according to an embodiment of the present disclosure.

Referring to FIG. 13, the S-GW receives a downlink data packet for the idle-state UE from the P-GW in operation 1301. Upon receiving the downlink data packet for the idle-state UE from the P-GW, the S-GW detects an EPS bearer including the data packet in operation 1303.

The S-GW detects a QCI of the detected EPS bearer and an APN of PDN connection included in the EPS bearer by using an EPS bearer context in operation 1305. The S-GW transmits the QCI and the APN information to the MME through a DDN message indicating that a downlink data packet to be transmitted to the UE is generated, in operation 1307.

The MME having received the DDN message including the QCI and the APN information may recognize the QCI and the APN information of the EPS bearer, without having to search for the EPS bearer context of the MME. Thus, the MME determines a transmission priority, for example, a transmission priority for transmission of a paging message, based on the QCI and the APN information included in the DDN message.

The UE may use a CSFB to be provided with a voice service in an LTE network. To use the CSFB, the UE needs to register itself in a Visitor Location Register (VLR) through the MME.

When the UE moves between a $3^{rd}$ Generation (3G) network and an LTE network, frequent location update of the user occurs. To reduce the frequent location update, that is, Routing Area Update (RAU) and TAU, an Idle-mode Signaling Reduction (ISR) function may be applied in which a context of the UE is registered in the SGSN and the MME at the same time.

However, when the ISR function is applied, the UE using CSFB may fail in paging for a received signal. That is, after moving to a 3G network, the ISR-function-applied UE performs a periodic RAU procedure. However, if a periodic RAU procedure fails due to signal attenuation, network congestion, coverage loss, or the like, the SGSN starts preset timer driving. If an RAU message has not been received from the UE until the timer expires, registration of the UE is released. Thereafter, if the UE is registered in the SGSN again, the VLR changes a paging path for the UE into the SGSN.

If the UE moves to the LTE network, the UE performs a TAU procedure. However, since the MME has not recognized that the paging path is changed into the SGSN, the MME does not transmit a location update request message to the VLR. Thus, the UE may not receive paging of a received CSFB call from the LTE network.

Hereinbelow, with reference to FIGS. 14 and 15, a description will be made of a procedure for releasing registration in the MME when registration of the ISR-function-applied UE in the SGSN is released.

Figure 14:
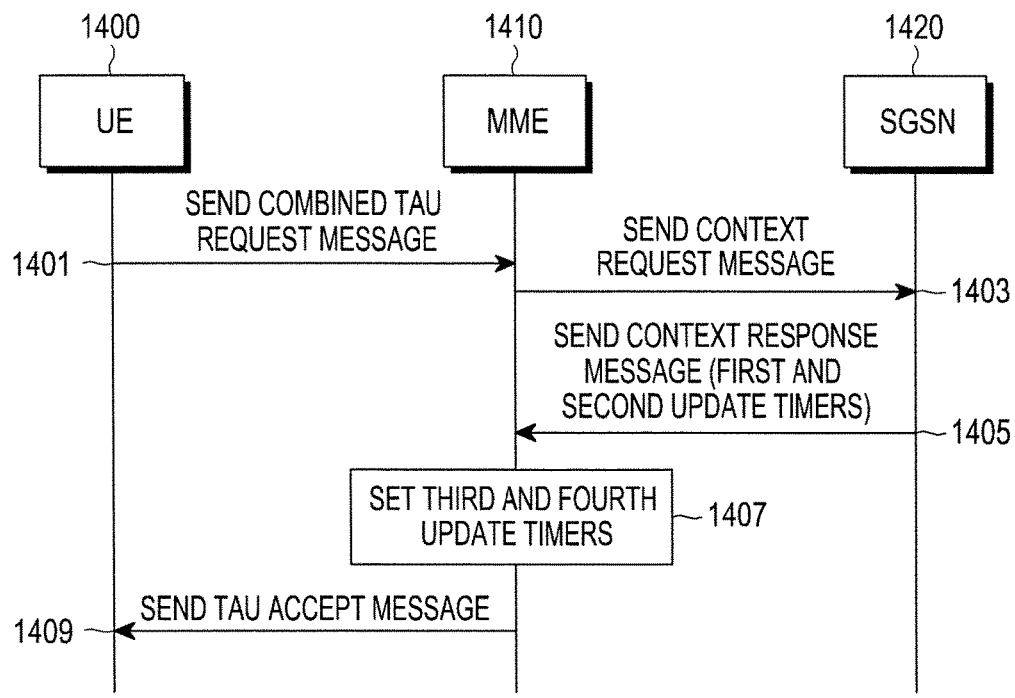
FIG. 14 is a diagram illustrating a procedure in which an MME and an SGSN synchronize update timers thereof for a UE to which an ISR function is applied in a mobile communication system according to another embodiment of the present disclosure.

FIG. 14 is a diagram illustrating a procedure in which an MME and an SGSN synchronize update timers thereof for a UE to which an ISR function is applied in a mobile communication system according to another embodiment of the present disclosure.

Referring to FIG. 14, the mobile communication system may include a UE 1400, an MME 1410, and an SGSN 1420, and the UE 1400 is assumed to be registered in the SGSN 1420.

The UE 1400 moves to an LTE network to send a combined TAU request message to the MME 1410, in operation 1401. The MME 1410 sends a context request message requesting a terminal context to the SGSN 1420 in operation 1420. Herein, the combined TAU request message includes combined type flag information indicating that SGs connection is necessary for CSFB or the like.

The SGSN 1420 transmits current values of a first update timer and a second update timer that are currently used for the UE through a context response message including the terminal context information, in operation 1405. Herein, the first update timer and the second update timer are timers managed by the SGSN 1420 for location update of the UE. In particular, the first update timer is a mobile reachable timer for monitoring a periodic RAU procedure, and the second update timer is an implicit detach timer for increasing the reliability of the first update timer.

Upon receiving the current values of the first update timer and the second update timer, the MME 1410 sets values of a third update timer and a fourth update timer managed by the MME 1410 to similar values to the values of the first update timer and the second update timer. Herein, the third update timer and the fourth update timer are timers managed by the MME 1410 for location update of the UE. In particular, the third update timer is a mobile reachable timer that performs the same function as the first update timer, and the fourth update timer is an implicit detach timer that performs the same function as the second update timer.

The MME 1410 sends, to the UE 1400, a TAU accept message including fifth and sixth timer values (corresponding to a periodic TAU timer and a deactivate ISR timer, respectively) that are timer values used by the UE based on the values of the third and fourth update timers, in operation 1409.

As such, as the MME 1410 and the SGSN 1420 synchronize their update timers with each other through operations 4105 and 4107, if registration of the ISR-function-applied UE 1400 in the SGSN 1420 is released, registration of the UE 1400 in the MME 1410 may also be released.

Figure 15:
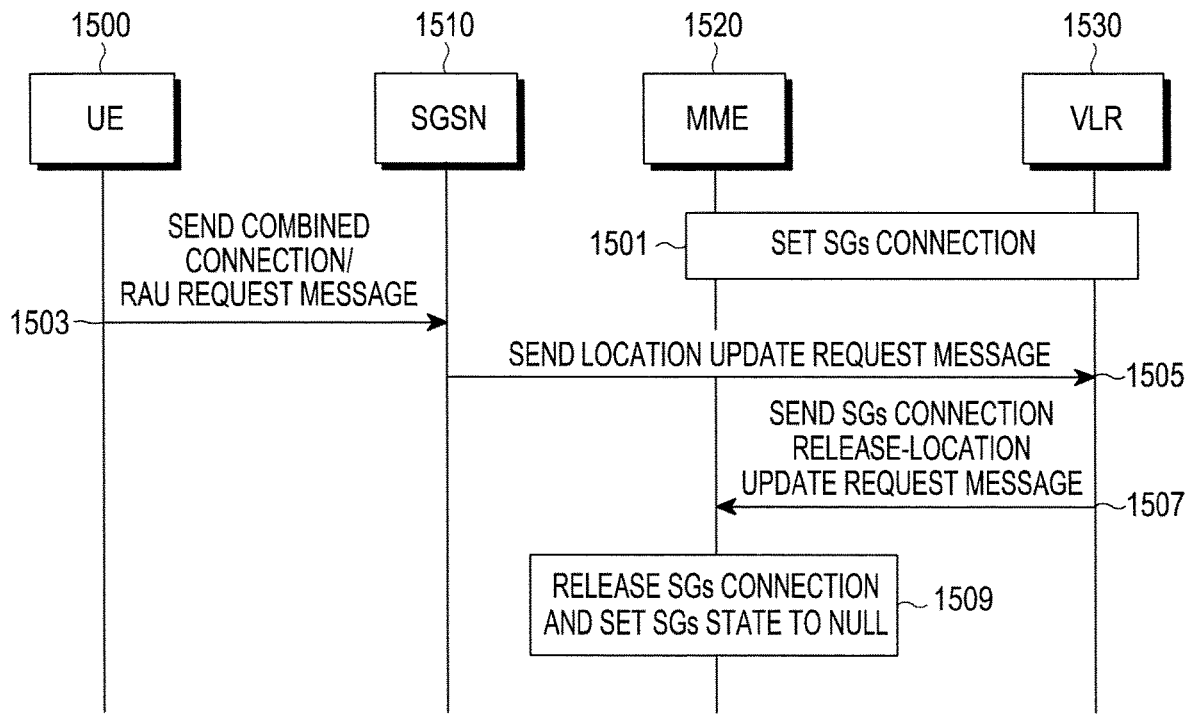
FIG. 15 is a diagram illustrating a procedure in which SGs connection is released for a UE to which an ISR function is applied in a mobile communication system according to another embodiment of the present disclosure.

FIG. 15 is a diagram illustrating a procedure in which SGs connection is released for a UE to which an ISR function is applied in a mobile communication system according to another embodiment of the present disclosure.

Referring to FIG. 15, the mobile communication system may include a UE 1500, an SGSN 1510, an MME 1520, and a VLR 1530. It is assumed that SGs connection is set in the MME 1520 and the VLR 1530. Herein, SGs connection setting 1501 means that the MME 1520 and the VLR 1530 are connected through a SGs interface.

The UE 1400 moves to a 3G network to send a combined attach request message or a combined RAU request message to the SGSN 1510 in operation 1503. The SGSN 1510 sends a location update request message to the VLR 1530 to set a paging path for a voice service to the SGSN 1510.

The VLR 1530 determines whether SGs connection setting 1501 with the MME 1520 exists. If determining that the SGs connection setting 1501 exists, the VLR 1530 sends, to the MME 1520, an SGs-Cancel-Location-request message indicating that SGs connection is not used any more due to change of a paging path, in operation 1507. In this case, the VLR 1530 transmits an ID indicating the UE 1400, that is, an International Mobile Subscriber Identity (IMSI), and a reason why SGs connection is not used, for example, the use of SGs connection between the VLR 1530 and the MME 1520, through the SGs connection release-location update request message.

Upon receiving the SGs connection release-location update request message, the MME 1520 releases SGs connection with the VLR 1530 and sets a SGs state to NULL. As such, when receiving the next combined attach request message or combined TAU request message from the UE 1500, the MME 1520 resets the SGs connection.

Typically, the UE sets Discontinuous Reception (DRX) as a way to reduce power consumption, and transmits or receives data by using the set DRX. Thus, in an embodiment of the present disclosure, to reduce power consumption, a way to set DRX of the UE will be provided. In the following description, according to an embodiment of the present disclosure, DRX set to the UE will be referred to as "extended DRX".

In an embodiment of the present disclosure, extended DRX uses a longer DRX cycle than an existing DRX cycle (or a normal DRX cycle). Conceptually, in a method proposed in an embodiment of the present disclosure, the UE notifies a base station or a core network of support information of the extended DRX, and additionally notifies the core network of extended DRX support information of base stations.

Based on information provided from a UE and a base station, the core network determines whether extended DRX is applicable and sets a DRX cycle if necessary (for example, if a UE operates in the low power mode).

In an embodiment of the present disclosure, a description will be made based on a separate notification of the extended DRX support information by the UE. However, this may be applied by being combined with a low power mode indicator (that is, the low power mode indicator may be transmitted when the UE supports the extended DRX).

First, to apply extended DRX, the UE determines when to receive a control channel by using a DRX cycle set to the UE, a current state of the UE (for example, an idle mode or a connected mode) and a frame number transmitted by a base station. To receive the control channel, the UE needs to determine whether to wake a transceiver up.

In the present disclosure, to implement extended DRX, it is necessary to support extension of a frame number by the UE and the RAN, that is, to support extension of a frame number transmitted by the base station to a larger value to apply extended DRX. Thus, transmission of a new frame number and determination of a DRX operation by using a new frame length may be new functions to the UE and the base station.

Next, a scheme for the UE and the network to notify support of extended DRX for application of the extended DRX needs to be provided.

Figure 16:
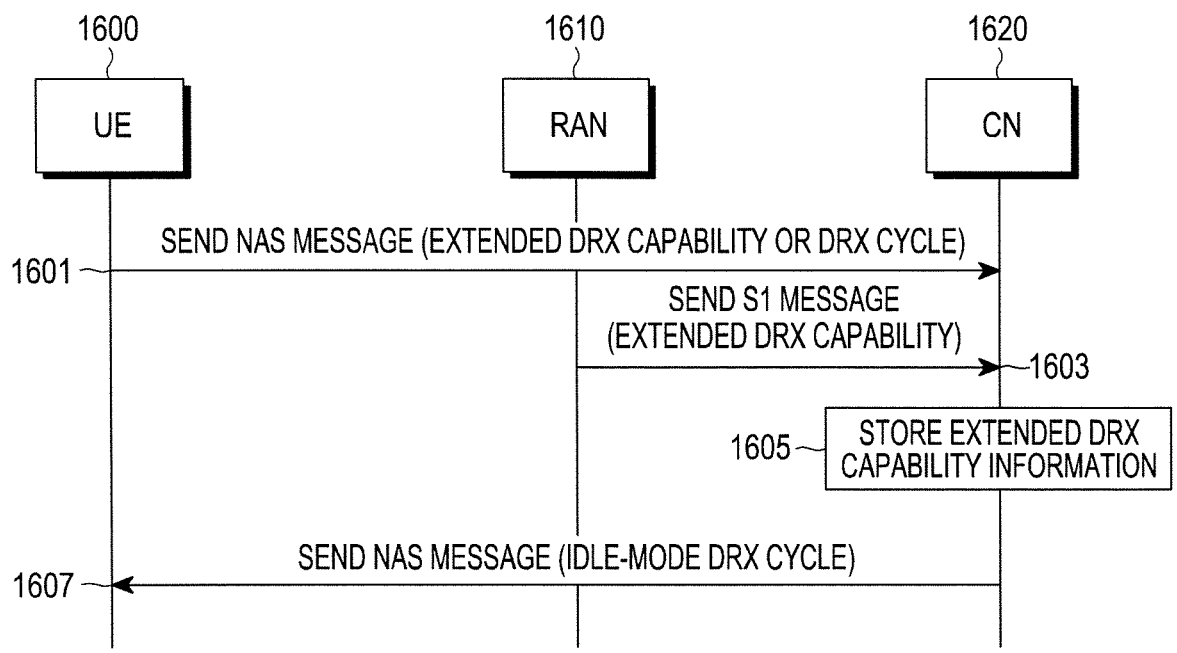
FIG. 16 is a diagram illustrating an example of a procedure for setting an extended DRX in a mobile communication system according to an embodiment of the present disclosure.

FIG. 16 is a diagram illustrating an example of a procedure for setting an extended DRX in a mobile communication system according to an embodiment of the present disclosure.

An example of a procedure illustrated in FIG. 16 proposes a method in which a UE delivers support of extended DRX through a NAS message such as an attach request or a TAU request. This information may be delivered through a UE network capability, an additional DRX parameter, or an MS network capability.

Referring to FIG. 16, a UE 1600 transmits an extended DRX capability or DRX cycle indicating whether the UE 1600 supports extended DRX to a Core Network (CN) 1620 through a NAS message in operation 1601. An RAN 1610 transmits an extended DRX capability indicating whether the RAN 1610 supports extended DRX to the CN 1620 through a S1 message in operation 1603.

The CN 1620 like the MME receives the NAS message and the S1 message from the UE 1600 and the RAN 1610, respectively, in operations 1601 and 1603. The CN 1620 may receive the NAS message and the S1 message from a plurality of UEs and a plurality of RANs.

The CN 1620 stores the extended DRX capability or DRX cycle included in the received NAS message as one of contexts corresponding to the UE and the extended DRX capability included in the received S1 message as one of contexts corresponding to the RAN, in operation 1605. The CN 1620 uses the stored information to determine the DRX cycle of the UE.

Once determining an idle-mode DRX cycle for the UE 1600, the CN 1620 transmits the determined DRX cycle (DRX in the idle mode) to the UE 1600 through the NAS message in operation 1607.

As described above, if the UE determines a point at which the UE receives a control channel using extended DRX, based on information (for example, a frame number) transmitted by the base station, then the base station needs to support a function for extended DRX (for example, support for a longer frame number or the like). To this end, the base station needs to notify the CN of whether the base station supports the extended DRX. The CN stores the provided information and considers the stored information when determining whether to apply the extended DRX to the UE.

However, instead of including a separate extended DRX capability, the UE requests information indicating a longer DRX cycle than a maximum DRX cycle (for example, 10.24 seconds) supported in an existing system, thereby notifying that the UE supports extended DRX.

Figure 17:
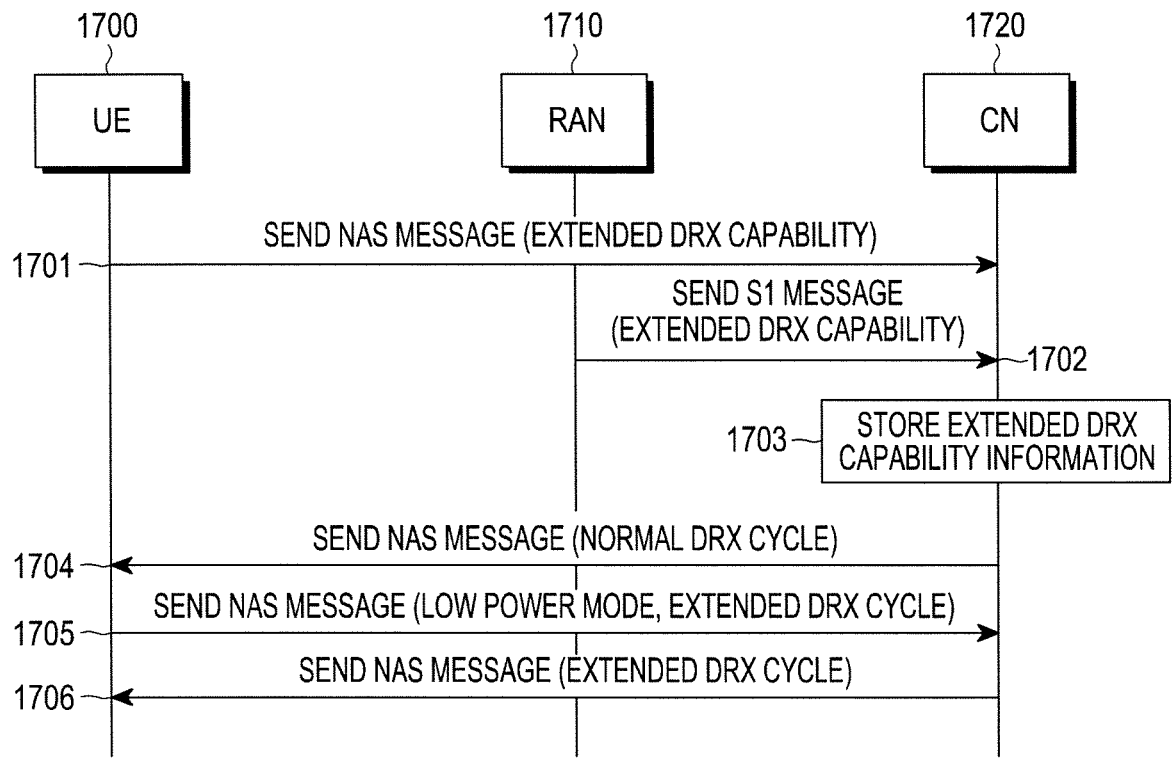
FIG. 17 is a diagram illustrating another example of a procedure for setting an extended DRX in a mobile communication system according to an embodiment of the present disclosure.

FIG. 17 is a diagram illustrating another example of a procedure for setting an extended DRX in a mobile communication system according to an embodiment of the present disclosure.

An example of a procedure illustrated in FIG. 17 proposes a method using a low power mode indicator of the UE. For example, if the UE and the network previously know whether extended DRX is supported, existing DRX is used in a normal situation and, if a situation requiring power saving in the UE occurs, the UE notifies the network of operating in the low power mode. In this case, extended DRX is set.

Referring to FIG. 17, a UE 1700 transmits extended DRX capability to a CN 1720 through a NAS message in operation 1701. An RAN 1710 transmits extended DRX capability to the CN 1720 through a S1 message in operation 1702.

The CN 1720 receives a NAS message and a S1 message from the UE 1700 and the RAN 1710 in operations 1701 and 1702. The CN 1720 may receive the NAS message and the S1 message from a plurality of UEs and a plurality of RANs.

The CN 1720 stores extended DRX capability included in the received NAS message as one of contexts corresponding to the UE and stores extended DRX capability included in the received S1 message as one of contexts corresponding to the RAN, in operation 1703. The CN 1720 uses the stored information to determine an extended DRX cycle of the UE.

However, the CN 1720 transmits a normal DRX cycle, instead of an extended DRX cycle, to the UE 1700 through the NAS message in operation 1704. This is because a special event, that is, a situation requiring power saving in the UE does not occur.

The UE 1700 transmits a power saving mode (or the low power mode) and an extended DRX cycle to the CN 1720 through the NAS message, if the event corresponding to the situation requiring power saving occurs, in operation 1705.

The CN 1620 determines the extended DRX cycle based on the previously stored information and transmits the determined extended DRX cycle (DRX in the idle mode) to the UE 1700 through the NAS message in operation 1706.

As such, in the example proposed in FIG. 17, if the power saving mode is necessary, the UE transmits the low power mode indicator to the CN through the NAS message (attach request or TAU request). The NAS message (attach request or TAU request) may include information indicating an extended DRX cycle to be used in the low power mode of the UE. Upon receiving the NAS message (attach request or TAU request) from the UE, the CN transmits an extended DRX cycle to be used by the UE through a NAS message responding thereto (attach accept or TAU accept). Thus, the UE sets the extended DRX cycle provided from the CN.

Figure 18:
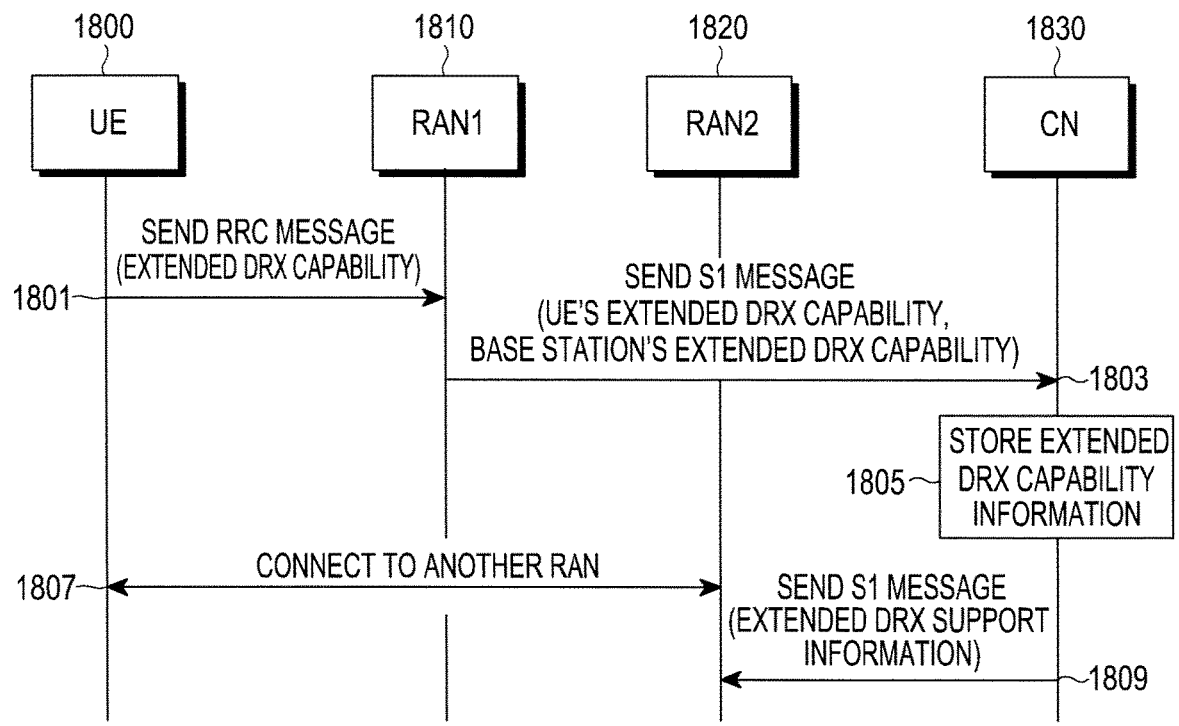
FIG. 18 is a diagram illustrating further another example of a procedure for setting an extended DRX in a mobile communication system according to an embodiment of the present disclosure.

FIG. 18 is a diagram illustrating further another example of a procedure for setting an extended DRX in a mobile communication system according to an embodiment of the present disclosure.

An example of a procedure illustrated in FIG. 18 proposes a method for notifying availability of extended DRX by using a RAN node (for example, a base station). For example, the UE provides extended DRX capability thereof to the RAN through the NAS message and the RAN delivers the extended DRX capability received from the UE and extended DRX capability of the RAN to the CN through the NAS message. The CN determines an extended DRX cycle based on the extended DRX capability of the UE and the extended DRX capability of the RAN, which are provided from the RAN, and delivers the determined extended DRX cycle to the UE through the RAN newly connected with the UE.

Referring to FIG. 18, a UE 1800 transmits extended DRX capability to a RAN1 1810 through a NAS message in operation 1801. Herein, the RAN1 1810 is a RAN to which the UE is currently RRC-connected.

The extended DRX capability may be provided by an ID field of a RRC message (a RRC connection setup request, UE capability information, or the like). The information may be included in one of Feature Group Indicator (FGI) bits that configure the RRC message or may be included in one of UE-EUTRA-Capability IEs.

The RAN1 1810 configures a S1 message including extended DRX capability of the UE 1800 received from the UE 1800 and extended DRX capability of the RAN1 1810, and transmits the configured S1 message to a CN 1830. The RAN1 1810 may receive a NAS message from a plurality of UEs, and in this case, the S1 message is configured to include extended DRX capability received from each of the plurality of UEs.

For example, when exchanging information about the UE 1800 with the CN 1830, the RAN1 1810 includes extended DRX support information of the UE 1800. The RAN1 1810 also delivers information whether the RAN1 1810 supports extended DRX. The delivery of the information may be performed using one of S1 messages. In particular, the extended DRX support information of the UE 1800 may be delivered through the wireless capability of the UE.

The CN 1830 receives a S1 message from the RAN1 1810 in operation 1803. The CN 1830 receives S1 messages from a plurality of UEs and a plurality of RANs.

The CN 1830 stores extended DRX capability of the UE and extended DRX capability of the RAN1, included in the received S1 message, as one of contexts in operation 1805. The CN 1830 uses the stored information to determine an extended DRX cycle of the UE.

The UE 1800 may move to another RAN. For example, the UE 1800 is assumed to move from the RAN1 1810 to an RAN2 1820.

The CN 1830 determines an extended DRX cycle of the UE 1800 by using the stored information. Thereafter, when the UE 1800 moves to set RRC connection with another RAN, that is, the RAN2 1820 in operation 1807, the CN 1830 notifies the RAN2 1820 of the extended DRX support information, together with a context regarding the UE 1800, through the S1 message (initial context setup request, or the like) in operation 1809. The extended DRX support information may be transmitted through one of UE wireless capability fields.

Figure 19:
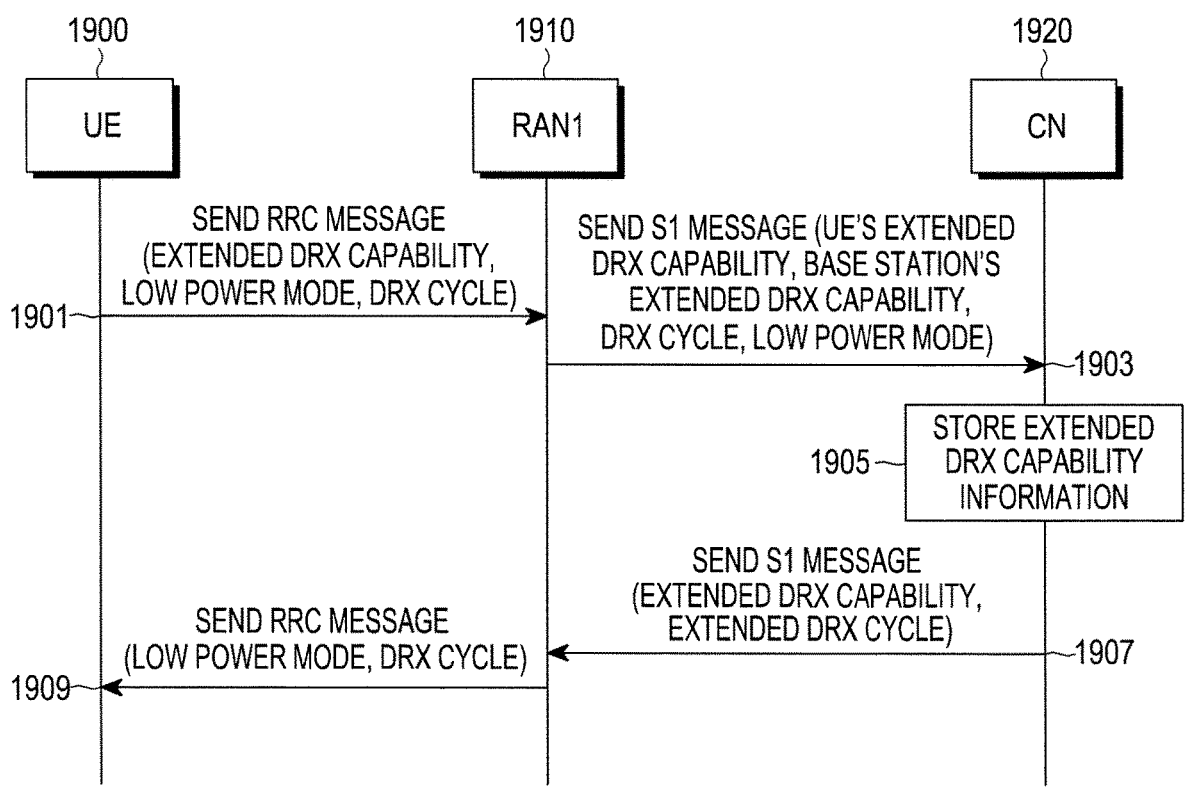
FIG. 19 is a diagram illustrating still another example of a procedure for setting an extended DRX in a mobile communication system according to an embodiment of the present disclosure.

FIG. 19 is a diagram illustrating still another example of a procedure for setting an extended DRX in a mobile communication system according to an embodiment of the present disclosure. That is, an example of a procedure illustrated in FIG. 19 proposes a method for exchanging extended DRX related information for application when the UE is determined to operate in the low power mode.

Referring to FIG. 19, a UE 1900 transmits a low power mode indicator, extended DRX support information, and a DRX cycle to be additionally used to an RAN1 1910 through an RRC message (for example, UE assistance information) in operation 1901. Transmission of the RRC message may be performed after the UE satisfies a particular condition (according to the above-described criterion) and is determined to operate in the low power mode.

The RAN1 1910 receives an RRC message from the UE 1900 and configures a S1 message (for example, a S1 UE context Release Request) including the UE's extended DRX capability support information and the DRX cycle, obtained from the received RRC message, the extended DRX capability and support information of the RAN1 1910, and also the low power mode indicator. The RAN1 1910 sends the configured S1 message to the CN 1920 in operation 1903.

The CN 1920 receives the S1 message from the RAN1 1910 in operation 1903. The CN 1920 may receive the S1 message from a plurality of RANs.

After obtaining the UE's extended DRX support information and cycle and the RAN1's extended DRX support information, included in the received S1 message, and additionally the low power mode indicator, the CN 1920 stores the obtained information as one of contexts in operation 1905. The CN 1920 uses the stored information to determine an extended DRX cycle of the UE 1900.

The CN 1920 determines the extended DRX cycle of the UE 1900 by using the stored information. Thereafter, the CN 1920 configures a S1 message including the determined extended DRX cycle and sends the configured S1 message to the RAN1 1910 in operation 1907.

The RAN1 1910 receives the S1 message from the CN 1920, and configures a RRC message based on information obtained through the received S1 message. The RRC message includes the low power mode indicator, and the extended DRX cycle obtained from the S1 message.

The RAN1 1910 sends the configured S1 message to the UE 1900 in operation 1909.

As such, the example proposed in FIG. 19 may be used together with the previously proposed embodiment. For example, if the CN stores extended DRX support information for the UE, the UE includes the low power mode indicator in the RRC message to be sent to the RAN. If the RAN includes the low power mode indicator in the message to be transmitted to the CN, then the CN sets the DRX cycle using the extended DRX information stored in the CN (extended DRX support and available DRX cycle) and notifies the RAN and the UE of the DRX cycle.

Figure 20:
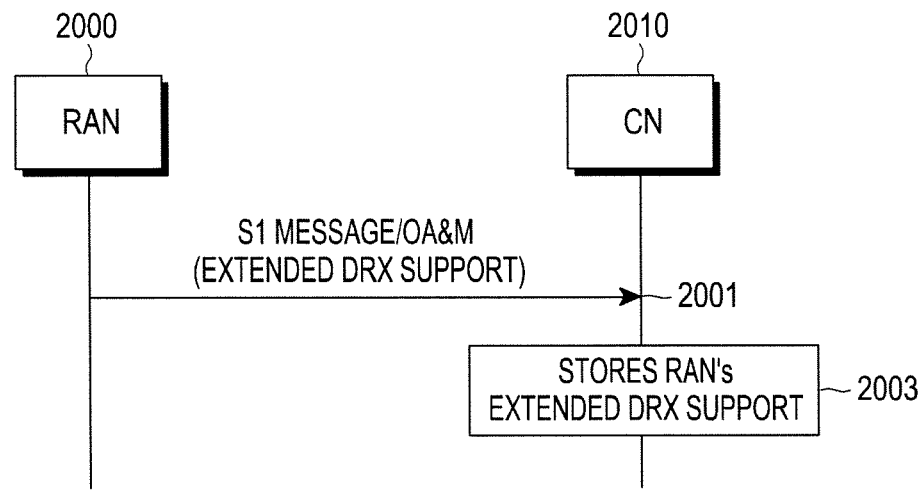
FIGS. 20 through 22 are diagrams illustrating an example of dividing a procedure according to the embodiment illustrated in FIG. 17 to design an independent procedure.
Figure 21:
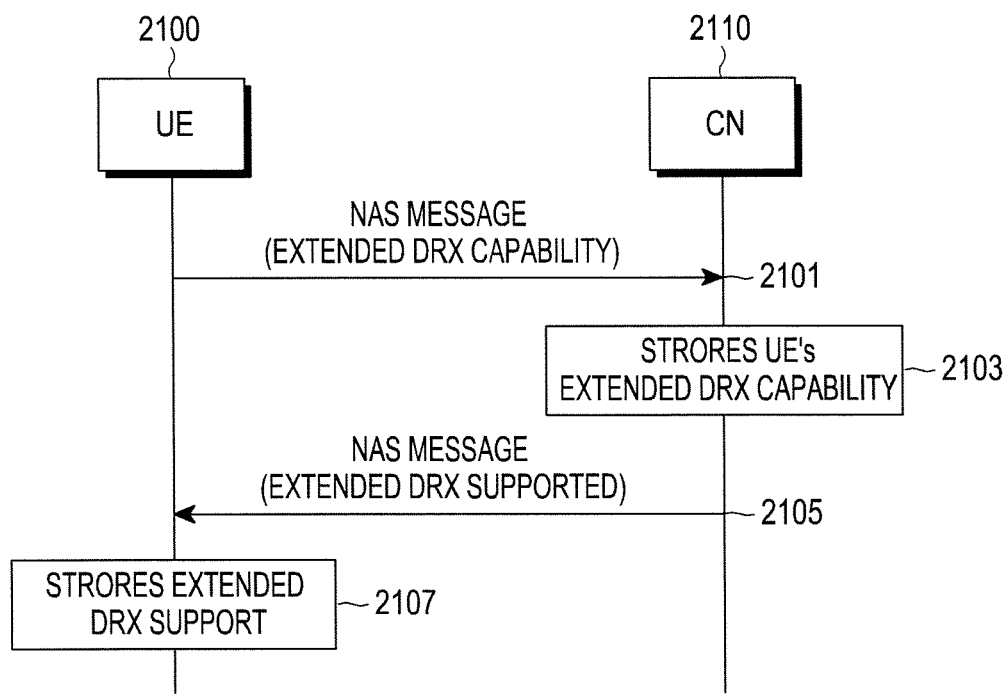
Figure 22:
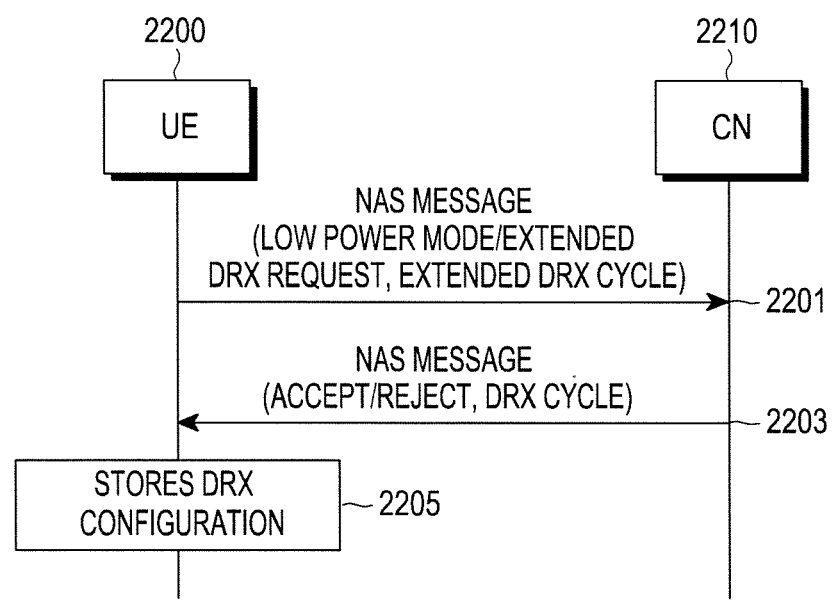

FIGS. 20 to 22 are diagrams illustrating an example of dividing a procedure according to the embodiment illustrated in FIG. 17 to design an independent procedure.

FIG. 20 is a diagram illustrating a procedure in which RANs notify a CN of whether the RANs support extended DRX, according to an embodiment of the present disclosure.

Referring to FIG. 20, an RAN 2000 notifies the CN of whether the RAN 2000 supports extended DRX through a S1 message (for example, S1 Setup). That is, the RAN 2000 sends the S1 message including whether the RAN 2000 supports extended DRX to a CN 2010 in operation 2001.

For example, the RAN 2000 transmits information of whether the RAN 2000 supports extended DRX to the CN 2010 by using Operations, Administration, and Management (OA & M).

The RAN 2000 sets an extended DRX supported flag in a message to be sent to the CN 2010, thus notifying the CN 2010 of whether the RAN 2000 supports extended DRX. If receiving this information, the CN 2010 stores the information for each RAN in operation 2003. The stored information may be used later for extended DRX.

FIG. 21 is a diagram illustrating a procedure in which a UE delivers information of whether the UE supports extended DRX through a NAS message such as an attach request or TAU request, according to an embodiment of the present disclosure. This information may be delivered through a UE network capability or additional DRX parameter, or an MS network capability field.

Referring to FIG. 21, a UE 2100 transmits an extended DRX capability and a DRX cycle to a CN 2110 through a NAS message in operation 2101. The CN 2110 such as an MME receives the NAS message from the UE 2100.

The CN 2110 stores the extended DRX capability and the DRX cycle included in the received NAS message as one of contexts corresponding to the UE in operation 2103, and the CN 2110 uses the stored information to determine whether the UE 2100 may use the extended DRX function.

The CN 2110 determines whether the UE 2100 may use extended DRX, by considering the extended DRX capability received from the UE 2100, the extended DRX capabilities of the RANs obtained using the procedure illustrated in FIG. 20 or another method, a tracking area list of the UE 2100, application or non-application of Idle-mode Signaling Reduction (ISR), and so forth.

The CN 2110 inserts information indicating whether extended DRX is supported into an NAS message to configure the NAS message (for example, attach accept or TAU accept). Thereafter, the CN 2110 sends the configured NAS message (for example, attach accept or TAU accept) to the UE 2100 in operation 2105.

The UE 2100 stores information included in the NAS message (for example, attach accept or TAU accept) received from the CN 2110 in operation 2107. If the extended DRX is supported, application of the extended DRX may be requested later.

FIG. 22 is a diagram illustrating a procedure when an event corresponding to a situation requiring a low power mode occurs according to an embodiment of the present disclosure.

In the procedure illustrated in FIG. 22, the UE may consider the information of whether the extended DRX is supported, received from the CN through the procedure illustrated in FIG. 21. That is, the UE may request application of the extended DRX when the CN notifies the UE that the extended DRX is supported.

Referring to FIG. 22, if determining to apply the extended DRX, a UE 2200 configures a NAS message including at least one of a low power mode (or power saving mode), an extended DRX request, and an extended DRX cycle, and sends the configured NAS message to the CN 2210 in operation 2201.

The CN 2210 determines whether the UE 2200 may use the extended DRX based on the stored information. That is, the CN 2210 may consider information of whether the UE is applied with ISR and a TA list currently used by the UE 2200 as well as the extended DRX capabilities received from the UE and the RANs in FIGS. 20 and 21.

If the UE 2200 has notified the extended DRX cycle through the NAS message, it is determined whether the DRX cycle may be used. If the UE 2200 has inserted only the extended DRX request or low power mode request into the NAS message, the CN 2210 determines an extended DRX cycle to be applied by the UE 2200 according to setting information.

The CN 2210 transmits an indicator indicating whether extended DRX is to be applied through a NAS response message to be sent to the UE 2200. If the UE 2200 has not requested the extended DRX cycle through the NAS message or the extended DRX cycle determined by the CN 2210 is different from a requested value, then the CN 2210 transmits the determined extended DRX cycle (DRX in the idle mode) to the UE 2200.

The UE 2200 stores DRX configuration information based on information collected from the CN 2210 in operation 2205.

As described above, the UE notifies the CN of information of whether extended DRX is supported or the extended DRX capability through an attach request message or a TAU request message. If receiving in advance the extended DRX support indicator or extended DRX parameter provided by the CN, the UE requests the CN to permit use of the extended DRX through the NAS message such as an attach request message or TAU request message. For example, if the CN broadcasts information of whether the extended DRX is supported or the supported extended DRX cycle through a System Information Block (SIB), then the UE having received the information or the supported extended DRX cycle may recognize the information of whether the RAN supports the extended DRX or recognize that the DRX cycle supported by the RAN is longer than a maximum value (for example, 2.56 seconds or 10.24 seconds) of an existing normal DRX cycle. Thus, the UE may notify the CN of the information of whether the extended DRX is supported and request use of the extended DRX when both the UE and the RAN support the extended DRX. An SIB transmitted by the RAN together with information related to extended DRX may be transmitted separately from existing SIBs, and in this case, the UE supporting the extended DRX receives the SIB and the UE not supporting or not requiring the extended DRX may skip reception of the SIB.

The CN determines the extended DRX cycle to be used by the UE, considering both the DRX cycle required by the UE and the maximum DRX cycle supported by the RAN. That is, if the UE requests X as the DRX cycle and the maximum DRX cycle supported by the RAN is Y, then the CN may set the DRX cycle for the UE to the smaller one of the two values by using Min(X, Y). For example, if the UE supporting the extended DRX requests 10.24 seconds as the DRX cycle and a base station where the UE is located does not support extended DRX, such that the maximum DRX cycle is 2.56 seconds, then the CN may set the DRX cycle to be used by the UE to 2.56 seconds and notify the set DRX cycle.

The DRX cycle supported by the UE and the RAN may be determined to be one of the following values:
  0.36 seconds (indicated by sf36 or number 36)
  0.4 seconds (indicated by sf40 or number 40)
  0.64 seconds (indicated by sf64 or number 64)
  0.8 seconds (indicated by sf80 or number 80)
  1.28 seconds (indicated by sf128 or number 128)
  1.6 seconds (indicated by sf160 or number 160)
  2.56 seconds (indicated by sf256 or number 256)
  5.12 seconds (indicated by sf512 or number 512)
  10.24 seconds (indicated by sf1024 or number 1024)

One of the foregoing values may be used when the UE, the CN, and the RAN notify DRX cycles supported/used by the UE, the CN, and the RAN.

If the base station notifies a DRX cycle supported by the base station through a SIB message, the SIB message may include at least one of values indicating the DRX cycle.

If the UE requests an extended DRX cycle the UE supports or is to use, the attach request message or TAU request message may include sf512 or sf1024 among the values indicating the DRX cycle.

If the CN determines and notifies the extended DRX cycle to be used by the UE, the attach request message or TAU accept message may include sf512 or sf1024 among the values indicating the DRX cycle. If the extended DRX is not applicable to the UE because of the base station or a network environment (ISR) where the UE is located, even if the UE requests the extended DRX, then the CN may determine and notify one of sf36, sf40, sf64, sf80, sf128, sf160, and sf256 as the DRX cycle through the attach accept message or the TAU accept message.

If both the UE and the RAN support the extended DRX and the UE currently uses the extended DRX, then a message (for example, S1_AP PAGING) notifying the DRX cycle of the UE to the base station from the CN may include sf512 or sf1024. The base station having received this message may recognize a timing for transmitting a paging message according to the DRX cycle of the UE.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

An apparatus and method for transceiving data to reduce battery consumption of a Uimplemented by hardware, software, or a combination of hardware and software. Such software may be stored, whether or not erasable or re-recordable, in a volatile or non-volatile storage such as a Read-Only Memory (ROM), a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus for transceiving data to reduce battery consumption of the UE according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The invention claimed is:
1. A method to transmit a data packet by a user equipment (UE) in a wireless communication system, the method comprising:
  entering a low power mode, the low power mode being configured to enable data transmission or reception by the UE when the UE determines a user inactive state and when a channel state of a wireless channel exceeds a transmission threshold, the UE in the low power mode being in a radio resource control (RRC) connected state but not in an idle state;

comparing an index indicating the channel state with the transmission threshold upon occurrence of a data packet to be transmitted to a base station;

initiating a transmission of the data packet on the wireless channel when the index indicating the channel state exceeds the transmission threshold; and continuing the transmission of the data packet in the user inactive state until an on-duration timer that starts from a point of the initiation of the transmission of the data packet expires.

2. The method of claim 1, further comprising:

determining a service priority for the data packet when the index indicating the channel state of the wireless channel is smaller than or equal to the transmission threshold, and transmitting the data packet when the service priority for the data packet is higher than a preset service priority.

3. The method of claim 2, further comprising:

comparing a number of data packets stored in a queue with a queue threshold when the service priority for the data packet is lower than or equal to the preset service priority, and transmitting a data packet stored in the queue when the number of data packets stored in the queue is larger than the queue threshold.

4. The method of claim 1, wherein entering the low power mode comprises:

transmitting a low power mode indicator indicating that the UE is to operate in the low power mode, a first on-duration timer value, and a queue threshold to the base station or a mobile management entity (MME); and receiving the low power mode indicator, a second on-duration timer value, the queue threshold, and the transmission threshold from the base station or the MME, wherein the second on-duration timer value is determined by the base station or the MME based on the first on-duration timer value.

5. The method of claim 1, further comprising:

receiving the transmission threshold and information related to a logical channel group including logical channels that are applied to the low power mode from the base station; and immediately transmitting the data packet to the base station, when the data packet is generated in logical channels included in the logical channel group.

6. The method of claim 5, further comprising:

transmitting, to the base station, information indicating that the UE determines the user inactive state when an input signal has not been received for a predetermined time.

7. A method to transmit a data packet by a base station in a wireless communication system, the method comprising:

determining whether a user equipment (UE) operates in a low power mode upon occurrence of a data packet to be transmitted to the UE, the low power mode being configured to enable data transmission or reception by the UE when the UE determines a user inactive state and when a channel state of a wireless channel exceeds a transmission threshold, the UE in the low power mode being in a radio resource control (RRC) connected state but not in an idle state;

comparing an index indicating the channel state with the transmission threshold if the UE operates in the low power mode;

initiating a transmission of the data packet in the user inactive state on the wireless channel when the index indicating the channel state exceeds the transmission threshold; and continuing the transmission of the data packet until an on-duration timer that starts at a point of the initiation of the transmission of the data packet expires.

8. The method of claim 7, further comprising:

determining a service priority for the data packet when the index indicating the channel state of the wireless channel is smaller than or equal to the transmission threshold, and transmitting the data packet when the service priority for the data packet is higher than a preset service priority.

9. The method of claim 8, further comprising:

comparing a number of data packets stored in a queue with a queue threshold when the service priority for the data packet is lower than or equal to the preset service priority, and transmitting a data packet stored in the queue when the number of data packets stored in the queue is larger than the queue threshold.

10. The method of claim 7, further comprising:

receiving, from the UE, a low power mode indicator indicating that the UE is to operate in the low power mode;

transmitting, to the UE, the transmission threshold and information related to a logical channel group including logical channels applied to the low power mode; and transmitting the data packet to the UE when the data packet is generated in logical channels included in the logical channel group.

11. The method of claim 10, further comprising:

receiving, from the UE, information indicating that the UE determines the user inactive state when an input signal has not been received for a predetermined time.

12. A user equipment (UE) in a wireless communication system, the UE comprising:

a transceiver; and a controller coupled with the transceiver and configured to:

enter a low power mode, the low power mode being configured to enable data transmission or reception by the UE when the UE determines a user inactive state and when a channel state of a wireless channel exceeds a transmission threshold, the UE in the low power mode being in a radio resource control (RRC) connected state but not in an idle state, compare an index indicating the channel state with the transmission threshold upon occurrence of a data packet to be transmitted to a base station, initiate a transmission of the data packet on the wireless channel when the index indicating the channel state exceeds the transmission threshold, and continue the transmission of the data packet in the user inactive state until an on-duration timer that starts from a point of the initiation of the transmission of the data packet expires.

13. A base station (BS) to transmit a data packet in a wireless communication system, the BS comprising:

a transceiver; and a controller coupled with the transceiver and configured to:

determine whether a user equipment (UE) operates in a low power mode upon occurrence of a data packet to be transmitted to the UE, the low power mode being configured to enable data transmission or reception by the UE when the UE determines a user inactive state and when a channel state of a wireless channel exceeds a transmission threshold, the UE in the low power mode being in a radio resource control (RRC) connected state but not in an idle state,
compare an index indicating the channel state with the transmission threshold if the UE operates in the low power mode,
initiate a transmission of the data packet when the index indicating the channel state exceeds the transmission threshold, and
continue the transmission of the data packet in the user inactive state until an on-duration timer that starts at a point of the initiation of the transmission of the data packet expires.

* * * * *